(12) United States Patent
 Saxena et al.

(10) Patent No.: US 9,690,928 B2
(45) Date of Patent: Jun. 27, 2017

(54) COMPUTING PLATFORM SECURITY METHODS AND APPARATUS

(71) Applicant: McAfee, Inc., Santa Clara, CA (US)

(72) Inventors: Paritosh Saxena, Portland, OR (US); Adrian M. M. T. Dunbar, London (GB); Michael S. Hughes, San Francisco, CA (US); John Teddy, Portland, OR (US); David Michael Durham, Beaverton, OR (US); Balaji Vembu, Folsom, CA (US); Prashant Dewan, Hillsboro, OR (US); Debra Cablao, Hillsboro, OR (US); Nicholas D. Triantafillou, Portland, OR (US); Jason M. Surprise, Beaverton, OR (US)

(73) Assignee: McAfee, Inc., Santa Clara, CA (US)

( * ) Notice: Subject to any disclaimer, the term of this patent is extended or adjusted under 35 U.S.C. 154(b) by 52 days.

(21) Appl. No.: 14/523,886

(22) Filed: Oct. 25, 2014

(65) Prior Publication Data

US 2016/0117498 A1    Apr. 28, 2016

(51) Int. Cl.
*G06F 21/44*   (2013.01)
*G06F 21/56*   (2013.01)
(Continued)

(52) U.S. Cl.
CPC .......... *G06F 21/445* (2013.01); *G06F 21/566* (2013.01); *G06F 21/57* (2013.01);
(Continued)

(58) Field of Classification Search
CPC ........ G06F 21/566; G06F 21/50; G06F 21/52; G06F 21/56
See application file for complete search history.

(56) References Cited

U.S. PATENT DOCUMENTS

| 7,065,630 | B1 | 6/2006 | Ledebohm et al. |
| 7,818,806 | B1 | 10/2010 | Gyugyi et al. |

(Continued)

FOREIGN PATENT DOCUMENTS

KR    20130108609    10/2013

OTHER PUBLICATIONS

International Searching Authority, "International Search Report," issued in connection with International Patent Application No. PCT/US2015/052331, mailed Jan. 13, 2016 (3 pages).

(Continued)

*Primary Examiner* — Tae Kim
*Assistant Examiner* — Khang Do
(74) *Attorney, Agent, or Firm* — Hanley, Flight & Zimmerman, LLC

(57) ABSTRACT

Computing platform security methods and apparatus are disclosed. An example apparatus includes a security application to configure a security task, the security task to detect a malicious element on a computing platform, the computing platform including a central processing unit and a graphics processing unit; and an offloader to determine whether the central processing unit or the graphics processing unit is to execute the security task; and when the graphics processing unit is to execute the security task, offload the security task to the graphics processing unit for execution.

21 Claims, 18 Drawing Sheets

(51) Int. Cl.
*G06F 21/57* (2013.01)
*G06F 21/71* (2013.01)
*G06F 21/74* (2013.01)

(52) U.S. Cl.
CPC .............. *G06F 21/71* (2013.01); *G06F 21/74* (2013.01); *G06F 2221/2149* (2013.01)

(56) References Cited

U.S. PATENT DOCUMENTS

| | | | |
|---|---|---|---|
| 8,176,555 B1* | 5/2012 | Schreiner | G06F 21/566 726/23 |
| 8,392,989 B2 | 3/2013 | Upadhyay | |
| 8,590,045 B2* | 11/2013 | Niemela | G06F 21/566 726/24 |
| 8,938,723 B1* | 1/2015 | Tormasov | G06F 8/52 717/136 |
| 9,104,873 B1 | 8/2015 | Chen et al. | |
| 9,202,054 B1* | 12/2015 | Lu | G06F 21/566 |
| 9,342,366 B2 | 5/2016 | Lee et al. | |
| 2004/0202110 A1 | 10/2004 | Kim | |
| 2005/0182966 A1 | 8/2005 | Pham et al. | |
| 2008/0016314 A1* | 1/2008 | Li | G06F 21/554 711/200 |
| 2008/0168308 A1 | 7/2008 | Eberbach et al. | |
| 2010/0281273 A1 | 11/2010 | Lee et al. | |
| 2011/0138487 A1 | 6/2011 | Cohen et al. | |
| 2012/0149464 A1 | 6/2012 | Bone et al. | |
| 2012/0222114 A1 | 8/2012 | Shanbhogue | |
| 2013/0054566 A1 | 2/2013 | Xu et al. | |
| 2013/0179971 A1* | 7/2013 | Harrison | G06F 21/55 726/23 |
| 2014/0052965 A1 | 2/2014 | Sarel | |
| 2014/0053267 A1* | 2/2014 | Klein | G06F 21/552 726/23 |
| 2014/0123280 A1* | 5/2014 | Kedma | G06F 21/56 726/23 |
| 2014/0280126 A1 | 9/2014 | Rash et al. | |
| 2014/0281365 A1* | 9/2014 | Mashey | G06F 12/1009 711/207 |
| 2014/0344488 A1* | 11/2014 | Flynn | G06F 5/14 710/52 |
| 2015/0128276 A1 | 5/2015 | Sanders | |

OTHER PUBLICATIONS

International Searching Authority, "Written Opinion," issued in connection with International Patent Application No. PCT/US2015/052331, mailed Jan. 13, 2016 (6 pages).

International Searching Authority, "International Search Report and Written Opinion," issued in connection with International Patent Application No. PCT/US2014/062303 mailed Jun. 24, 2015 (16 pages).

United States Patent and Trademark Office, "Non-Final Office Action," issued in connection with U.S. Appl. No. 14/523,884, mailed Mar. 2, 2016 (10 pages).

United States Patent and Trademark Office, "Final Office Action," issued in connection with U.S. Appl. No. 14/523,884, mailed Jul. 6, 2016 (11 pages).

United States Patent and Trademark Office, "Notice of Panel Decision from Pre-Appeal Brief Review," Issued in connection with U.S. Appl. No. 14/523,884, mailed Nov. 22, 2016 (2 pages).

United States Patent and Trademark Office, "Non-Final Office Action," issued in connection with U.S. Appl. No. 14/780,363, mailed Nov. 16, 2016 (16 pages).

* cited by examiner

_COMPUTING PLATFORM SECURITY METHODS AND APPARATUS_

FIELD OF THE DISCLOSURE

This disclosure relates generally to computing platforms and, more particularly, to computing platform security methods and apparatus.

BACKGROUND

Computing platforms often include more than one processing unit. For example, a computing platform may include a central processing unit (CPU) and a graphics processing unit (GPU). The GPU typically cooperates with a graphics driver to generate an output (e.g., an image or series of images) to be conveyed to a display device (e.g., a monitor or a screen).

DETAILED DESCRIPTION

Figure 1:
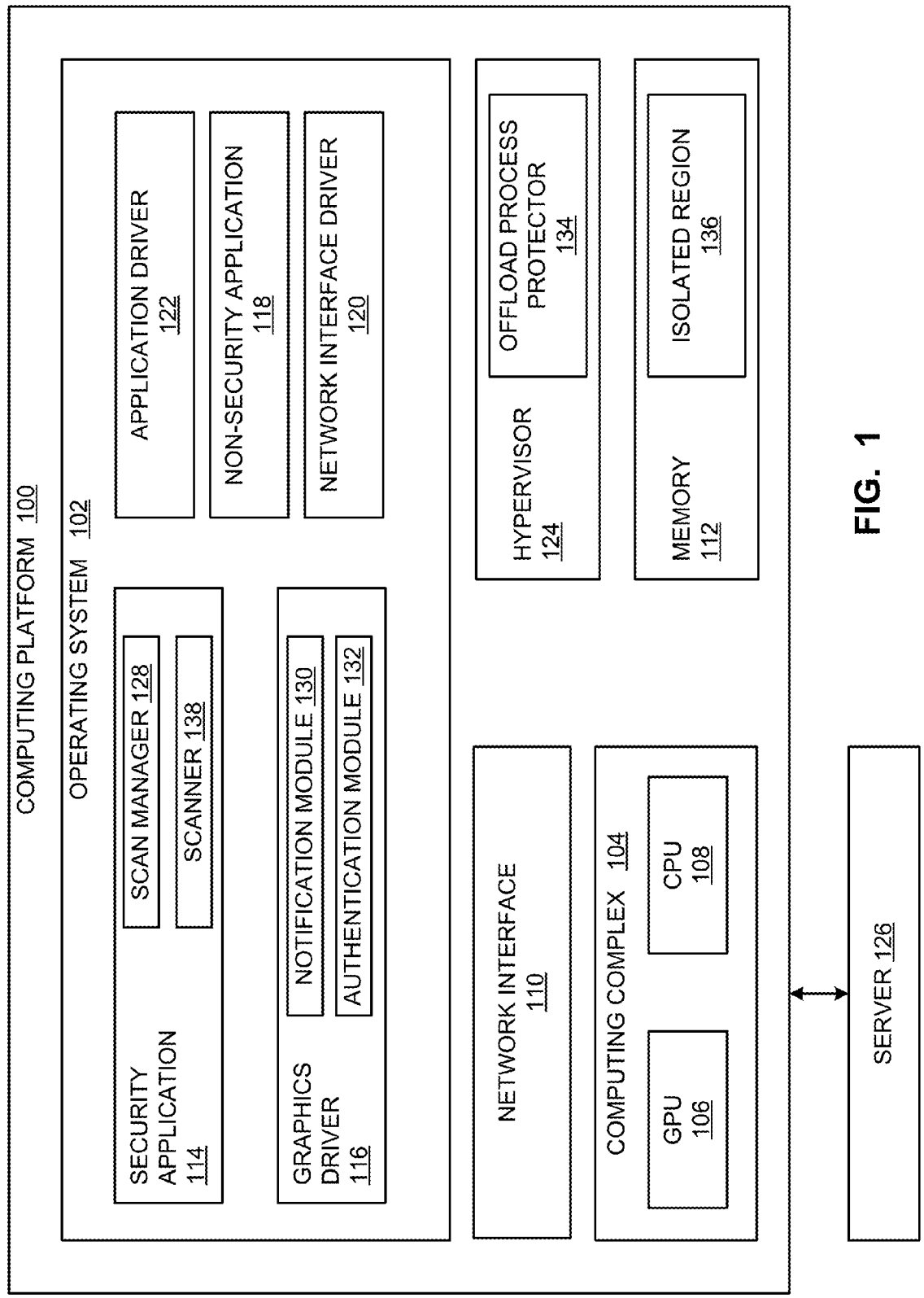
FIG. 1 is an illustration of an example computing platform constructed in accordance with teachings of this disclosure.

Example methods and apparatus disclosed herein provide enhanced protection for computing platforms. Typically, security applications (e.g., malware detection programs) configure and implement one or more security tasks to detect and/or remove one or more malicious elements (e.g., malware, suspicious communications, viruses, etc.) on a computing platform. In known systems, security tasks (e.g., programs, applications, processes, functions, operations, workloads computations, etc.) are executed by a central processing unit (CPU) of the computing platform. However, usage of the CPU for security tasks (e.g., memory scans associated with malware detection) often consumes significant amounts of CPU cycles, which may negatively impact the computing platform in terms of, for example, user-visible performance, battery life, throughput, etc. Some computing platforms establish CPU cycle and/or power restrictions or limitations (e.g., benchmarks) that an application is required to meet before the application can be installed and/or executed on the computing platform. Accordingly, reduction of CPU usage is often beneficial.

Examples disclosed herein alleviate, mitigate, and/or eliminate negative impacts of executing computing tasks (e.g., security tasks and/or any other type of computing task(s)) on the CPU by offloading one or more computing tasks (e.g., security tasks) to a graphics processing unit (GPU). Computing tasks offloaded to the GPU by examples disclosed do not consume CPU cycles, thereby reducing the computation burden of the CPU and the amount of power consumed by the CPU. As the number of CPU cycles consumed by an application and/or an amount of CPU-related power consumed by the application are often used to measure performance of an application, examples disclosed herein are especially attractive to, for example, independent software vendors (ISVs) and other types of developers required to meet restrictions or limitations (e.g., benchmarks) placed on CPU cycle and/or power consumption.

Moreover, when the tasks offloaded to the GPU are security tasks, examples disclosed herein enable the computing platform to be more aggressive against security threats, such as malware. That is, examples disclosed herein alleviate, mitigate and/or eliminate costs associated with CPU execution of security tasks and, thus, enable more frequent execution of the security tasks. For example, with a memory scan being executed by the GPU rather than the CPU, examples disclosed herein reduce or eliminate any CPU consumption concern associated with the memory scan. In systems that only utilize the CPU for security tasks, such CPU consumption may have prevented or delayed one or more iterations of the memory scan. Because malware is a persistent threat that can arise at any moment, such prevention or delay reduces an ability of the computing platform to effectively protect itself against malware. In contrast, by utilizing the GPU for security task execution in addition to or in lieu of the CPU, examples disclosed herein reduce or eliminate the concern of excessive CPU consumption such that memory scans and/or other malware detection techniques can be performed more aggressively (e.g., more frequently, across more memory, searching for more patterns, etc.).

Moreover, examples disclosed herein recognize that the GPU is often better suited than the CPU for executing certain security tasks. For example, malware detection techniques often involve scanning operations that process large portions of memory searching for one or more patterns known to correspond to malicious code (e.g., Advanced Persistent Threats (APTs)). GPUs are designed to render and accelerate display information, which involves accessing and buffering large portions memory quickly. While GPUs are designed to handle such scanning operations quickly and efficiently, GPUs handle conditional logic operations less quickly and less efficiently, especially relative to CPUs. Thus, relative to conditional computing tasks that involve decisions and condition evaluations (e.g., mathematical operations) performed well by the CPUs, malware detection computing tasks are well suited for execution on GPUs. Put another way, examples disclosed herein recognize that computing tasks involving memory scanning (e.g., pattern detection) are good candidates for offloading to GPUs because GPUs are designed for handling such tasks. Moreover, in many systems, the GPU consumes less power than the CPU. Accordingly, power consumption performance is improved by offloading processing heavy tasks, such as memory scans, away from the CPU and toward the GPU. Thus, in addition to reducing or eliminating CPU consumption by security tasks, examples disclosed herein provide faster, more efficient, and less power consuming execution of security tasks. This enhancement provided by examples disclosed herein further enables security applications to more aggressively (e.g., more frequently, across more memory, searching for more patterns, etc.) execute malware detection operations because more operations can be accomplished in shorter periods of time.

Additionally, examples disclosed herein recognize and meet challenges involved in offloading tasks to the GPU. For example, although access to certain aspects of the GPU is sometimes limited, methods and apparatus disclosed herein provide an ability to monitor and convey information regarding a status of tasks offloaded to the GPU. In particular, examples disclosed herein include a graphics driver that provides status information regarding tasks offloaded to the GPU (e.g., security tasks offloaded by a security application and/or any other type of task) to components associated with the offloaded tasks. For example, the graphics driver disclosed herein determines that a security task offloaded to the GPU has begun execution, has been delayed in connection with a priority schedule, as been pre-empted, has completed, and/or obtains any other suitable type status indication. Examples disclosed herein enable the graphics driver to notify the component(s) associated with the tracked offloaded tasks of the determined status. In some examples disclosed herein, the graphics driver provides the status information to the component(s) associated with the offloaded task in a secure manner. For example, the notification of status information provided by examples disclosed herein is conveyed to the component(s) at a particular privilege level (e.g., ring 0 in an Intel® architecture) to ensure that the status information cannot be abused by, for example, malware attempting to intercept the status information for use against the computing platform. The components receiving the status information via examples disclosed herein can measure progress of current tasks, consider processing delays for pending tasks, adjust priorities assigned to current or future tasks, and/or scrutinize one or more components responsible for delays and/or preemptions of the security tasks. Accordingly, examples disclosed herein securely provide security applications (and/or any other type of application(s) that offload any type of task to the GPU) with valuable information to enhance, for example, malware detection techniques to better protect the computing platform.

Additionally, although offloading tasks to the GPU may involve conveyance of sensitive data, examples disclosed herein provide protection to the offloading process and/or the tasks that have been offloaded to the GPU. That is, offloading a computing task to hardware other than the CPU may involve risk. For examples, in known systems, computing tasks executed by the GPU are not subject to the same privilege level monitoring as computing tasks executed by the CPU. As such, examples disclosed herein recognize that malware seeking to remain undetected may exploit the less secure GPU of known systems. In some instances, under the guise of an offloaded computing task, malware (e.g., malicious code having ring-0 permission in the Intel® architecture) can destroy and/or modify code and/or memory associated with the GPU. This vulnerability is especially concerning for a security application (e.g., a malware detector) wanting to utilize the GPU because, for security applications, integrity of the security code itself is crucial.

To maintain this integrity, examples disclosed herein provide enhanced protection for computing platforms in which one or more computing tasks are offloaded to the GPU. Examples disclosed herein harden a graphics driver that controls the GPU with protection mechanisms to reduce, if not eliminate, instances of malware being executed by the GPU. In some examples disclosed herein, the graphics driver requires any application driver attempting to offload a computing task to the GPU to establish a trusted channel with the graphics driver. For example, the trusted channel established by examples disclosed herein requires mutual authentication between the graphics driver and a driver associated with the application before a computing task can be offloaded to the GPU by that application. With the trusted channel(s) provided by example disclosed herein in place, the graphics driver can trust data received from the mutually authenticated application driver, thereby reducing, if not eliminating, instances of the graphics driver conveying malicious code to the GPU in connection with an offload process.

As additional or alternative protection for computing task(s) offloaded to the GPU, examples disclosed herein include a protection layer implemented between an operating system (OS) and the GPU. In some examples disclosed herein, the protection layer is implemented by a hypervisor such as, for example, a memory protected hypervisor (e.g., Trusted Memory Services Layer (TMSL) provided by Intel®) executed outside the OS. In some examples disclosed herein, the protection layer is between the OS and the GPU to ensure that malware does not subvert computing tasks executed by the GPU. The hypervisor of disclosed examples has a highest privilege level (e.g., ring-1 privilege) possible on the computing platform and, thus, is able to monitor memory access attempts made by application of any privilege level. Examples disclosed herein, via the protection layer, create an isolated (e.g., not visible to the OS)

region of memory in which computing task(s) offloaded to the GPU are executed. As such, the offloaded computing task(s) are isolated from other, unprivileged regions of memory to be utilized by traditional GPU tasks, such as image rendering.

In some examples disclosed herein, the hypervisor of the protection layer detects attempted access of the isolated memory and reports the attempted access to, for example, the graphics driver. Such detections may correspond to malware attempting to access the isolated memory. As such, examples disclosed herein detect an attempt of malware to attack the GPU before memory access of the attack is granted, thereby thwarting the malware and protecting the offloaded computing task executing in the isolated memory associated with the GPU. In some examples disclosed herein, one or more keys used for the mutual authentication associated with the trusted channel disclosed herein are stored in the isolated memory such that access to the key(s) is monitored by the example protection layer disclosed herein. Thus, examples disclosed herein provide a plurality of protection enhancements to computing platforms in which one or more computing tasks are offloaded from the CPU and onto the GPU.

Additionally, examples disclosed herein include network communication techniques that enable computing platforms to more effectively and more rapidly detect, remedy and/or remove malware currently infecting the computing platforms. In some known systems, malware detection information is collected (e.g., via a network) from a plurality of endpoint devices (e.g., computing platforms) to identify patterns seen on multiple devices that may correspond to malware and/or nefarious network traffic. Such data aggregation systems are useful in identifying threats and gaining knowledge of the threats. To further take advantage of the information gathered across the multiple devices, examples disclosed herein enable the knowledge garnered from the collected information to be fed back to the individual endpoint devices in real time (e.g., as quickly as possible subject to computational and/or transmission constraints) such that the individual endpoint devices can utilize the garnered knowledge to detect, remedy, and/or remove the corresponding malware. Put another way, examples disclosed herein utilize network telemetry to provide information gathered from a group of devices to individual endpoints, thereby enabling utilization of the collective knowledge at the individual endpoints to better deal with malware at a time that the malware is likely active (e.g., currently infecting and/or otherwise acting on the computing platform).

For example, a malware detector executing on a first computing platform constructed in accordance with examples disclosed herein receives data related to potential malware patterns from a second computing platform via a network. According to examples disclosed herein, the malware detector of the first computing platform utilizes the data for a memory scan (e.g., executed on the corresponding CPU and/or the corresponding GPU) of the first computing platform. In such examples, knowledge of detections of malware active on the network, as recognized by the second computing platform and/or an aggregator configured to receive information from the first and second computing platforms, is shared with the first computing platform to enable the first computing platform to more efficiently and rapidly resolve the malware while the malware is active (e.g., executing on the first computing platform). While some examples disclosed herein involve security tasks offloaded to a GPU, the examples network communication techniques disclosed herein can be utilized in connection with security tasks executed by any suitable component such as, for example, a CPU.

Additionally, examples disclosed herein include memory scanning techniques that enhance an ability of computing platforms to, for example, search for malware-indicative patterns. In particular, examples disclosed herein provide an ability to execute data-parallel functions (e.g., OpenCL kernels) for searching memory in connection with, for example, malware detection tasks. As disclosed in detail below, examples disclosed herein map a fixed-size sliding window of memory regions to a virtual address space of a user-mode client. The sliding window provided by examples disclosed herein is able to contain data originating from a plurality of processes (e.g., memory corresponding to a plurality of processes). As such, a corresponding scan (e.g., for malware-indicative patterns) can operate on memory corresponding to a plurality of processes in parallel. This is in contrast to known systems in which a function or process only has access to memory which that function or process explicitly maps (e.g., via buffers). That is, in known systems, functions such as OpenCL tasks have tended to be process-local. In contrast, examples disclosed herein enable analysis of memory system-wide, at high throughput due to a parallelization of memory scanning operations.

FIG. 1 illustrates an example computing platform 100 constructed in accordance with teachings of this disclosure. The example computing platform 100 of FIG. 1 includes an operating system (OS) 102, a computing complex 104 having a graphics processor unit (GPU) 106 and a central processing unit (CPU) 108, a network interface 110, a memory 112, a security application 114, a graphics driver 116, a non-security application 118, a network interface driver 120, an application driver 122, and a hypervisor 124. In the illustrated example of FIG. 1, the computing platform is in communication (e.g., via a network such as the Internet or a private network) with a server 126. In the illustrated example of FIG. 1, the server 126 is associated with the example security application 114. For example, the example server 126 communicates updates associated with malware-indicative patterns to the security application 114 and/or provides one or more security services (e.g., malware remediation services) to the security application 114).

In the illustrated example of FIG. 1, the security application 114 of FIG. 1 includes a scan manager 128 constructed in accordance with teachings of this disclosure. The example scan manager 128 of FIG. 1 facilitates one or more security tasks associated with the security application 114 to protect the example computing platform 100. An example implementation of the scan manager 128 of FIG. 1 is disclosed in detail below in connection with FIG. 2. As disclosed below, the example scan manager 128 of FIG. 1 utilizes the example GPU 106 of the computing platform 100 to perform one or more tasks, such as security tasks. In some examples, the scan manager 128 of FIG. 1 offloads security task(s) to the GPU 106 rather than utilizing the CPU 108 to execute the security task(s). For example, the scan manager 128 of FIG. 1 offloads to the GPU 106 a scan of one or more portions of the example memory 112 for patterns indicative of malware. As described in detail below in connection with FIG. 2, the offloading of security task(s) to the GPU 106 provided by the example scan manager 128 of FIG. 1 enables more efficient and more aggressive scans (e.g., more frequent scans, more comprehensive scans in terms of number of tested patterns, and/or more extensive scans in terms amounts of memory scanned) relative to systems that utilize and burden only the CPU 108 with execution of security tasks.

In the illustrated example of FIG. 1, the graphics driver 116 includes a notification module 130 constructed in accordance with teachings of this disclosure. An example implementation of the notification module 130 of FIG. 1 is disclosed in detail below in connection with FIG. 3. As disclosed below, in addition to facilitating interactions between elements of the OS 102 and the GU 106, the example graphics driver 116 of FIG. 1 utilizes the example notification module 130 to securely provide consumers of the GPU 106 (e.g., applications and/or drivers utilizing the GPU 106 to execute operations) with status notifications associated with tasks offloaded to the GPU 106. For example, when the example security application 114 (e.g., via the scan manager 128) offloads a memory to the GPU 106, the example notification module 130 of FIG. 1 notifies the security application 114 that the memory scan has been initiated, that the memory scan has been completed, that the memory scan has been preempted, that a particular process has preempted the memory scan, an identity of the particular process that preempted the memory scan, and/or any other suitable status information. Additionally or alternatively, when the non-security application 118 offloads a non-security task to the GPU 106, the example notification module 130 of FIG. 1 notifies the non-security application 118 that the memory scan has been initiated, that the memory scan has been completed, that the memory scan has been preempted, that a particular process has preempted the memory scan, an identity of the particular process that preempted the memory scan, and/or any other suitable status information. Notably, the example notification module 130 of FIG. 1 provides the notifications in a secure manner (e.g., at a privilege level enjoyed only by trusted components, such as ring 0 of the Intel architecture) such that the information of the notifications cannot be used maliciously by, for example, malware.

As described in detail below, the consumers (e.g., the security application 114 or the non-security application 118) of the GPU 106 can utilize the status information provided by the example notification module 130 in any suitable manner including, for example, enhancing malware detection capability of the security application 114. Further, the example notification module 130 of FIG. 1 enables the consumers of the GPU 106 to provide schedule and/or priority assignments to tasks offloaded to the GPU 106. As such, the example notification module 130 of FIG. 1 enables components utilizing the GPU 106 (e.g., the security application 114 and/or the non-security application 118) to assign a priority level to tasks destined or already being executed by the GPU 106 based on, for example, an importance of the task.

In the illustrated example of FIG. 1, the graphics driver 116 includes an authentication module 132 constructed in accordance with teachings of this disclosure. The example authentication module 132 of FIG. 1 cooperates with the example application driver 122, which is constructed in accordance with teachings of this disclosure, to protect the offloading of tasks to the GPU (e.g., as facilitated by the example scan manager 128). In the illustrated example of FIG. 1, the application driver 122 is associated with the example security application 114. An example implementation of the authentication module 132 of FIG. 1 is disclosed in detail below in connection with FIG. 5. An example implementation of the application driver 122 of FIG. 1 is disclosed in detail below in connection with FIG. 6. As disclosed below, the example authentication module 132 and the example application driver 122 establish a mutual authentication to ensure that the process of offloading tasks to the GPU 106 and the corresponding data are protected (e.g., by only being handled by trusted components).

In the illustrated example of FIG. 1, the hypervisor 124 includes an offload process protector 134 constructed in accordance with teachings of this disclosure. An example implementation of the offload process protector 134 of FIG. 1 is disclosed in detail below in connection with FIG. 7. As disclosed below, the example offload process protector 134 of FIG. 1 utilizes the privilege level of the hypervisor 124 to monitor components handing the offload process and the corresponding data. For example, the offload process protector 134 monitors an isolated segment 136 of the memory 112 dedicated to tasks offloaded to the GPU 106 and executes one or more checks or verifications in response to attempts to access the isolated segment 136 of the memory 112.

In the illustrated example of FIG. 1, the network interface driver 120 is constructed in accordance with teachings of this disclosure. An example implementation of the network interface driver 120 is disclosed below in connection with FIG. 10. As disclosed below, in addition to facilitating interactions between element of the computing platform 100 (e.g., the OS 102), the example network interface driver 120 of FIG. 1 cooperates with the example network interface 110 to send and receive information related to security operations over a network (e.g., the Internet) to and from other computing platforms (e.g., endpoint devices and/or network nodes that collect information from endpoint devices). To enhance security operations associated with, for example, the security application 114, the example network interface driver 120 of FIG. 1 receives data from the other computing platforms regarding potential malware detected on those other computing platforms. For example, one or more patterns detected on one or more of the other computing platforms may be conveyed to the network interface 110 in real time (e.g., without delay or as soon as reasonably possible). The example network interface driver 120 of FIG. 1 receives the information and makes the information available to, for example, the security application 114 in real time (e.g., without delay or as soon as reasonably possible). As such, the example network interface driver 120 of FIG. 1 receives the malware-indicative information when the corresponding malware is likely active on the network and, thus, the example computing platform 100. Accordingly, the example network interface driver 110 of FIG. 1 increases and/or improves an ability of, for example, the security application 114 of FIG. 1 to detect malware while the malware is active and unobfuscated (e.g., unpacked or decrypted). The example network interface driver 120 of FIG. 2 facilitates the exchange of data associated with security tasks being executed or security tasks to be executed on any suitable component, such as the GPU 106 and/or the CPU 108.

In the illustrated example of FIG. 1, the security application 114 includes a scanner 138 constructed in accordance with teachings of this disclosure. An example implementation of the scanner 138 of FIG. 1 is disclosed in detail below in connection with FIG. 8. As disclosed below, the example scanner 138 of FIG. 1 enables parallelization of scanning operations that span regions of memory corresponding to a plurality of processes or functions, thereby improving throughput of one or more scanning operations (e.g., searching for malware-indicative patterns in memory).

Figure 2:
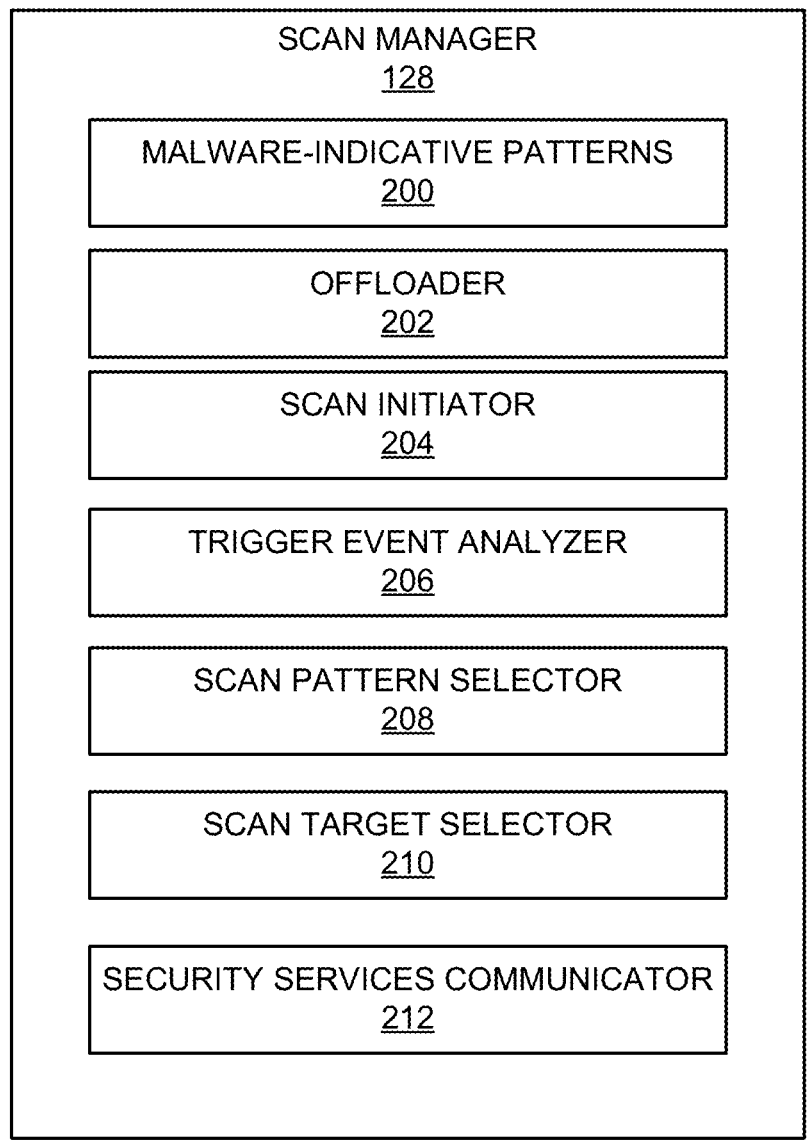
FIG. 2 is a block diagram of an example implementation of the example scan manager of FIG. 1.

FIG. 2 is a block diagram of an example implementation of the example scan manager 128 of the example security application 114 of FIG. 1. The example security application 114 of FIG. 1 is tasked with protecting the example computing platform 100 from malware and the example scan manager 128 is tasked with managing memory scans that enable the protection. The example scan manager 128 of FIG. 2 maintains a plurality of malware-indicative patterns 200 that have been identified (e.g., by a developer of the security application 114, an entity associated with the example server 126 and/or other computing platforms such as the external computing platforms 400 of FIG. 4) as potentially corresponding to the computing platform 100 being infected with malware. Example malware to which the example malware-indicative patterns 200 of FIG. 2 correspond includes obfuscated (e.g., encrypted and/or packed) files, polymorphic malware, and/or file-less malware such as Internet worms, browser exploits, and/or malicious code utilizing reflective DLL injection techniques. In the illustrated example of FIG. 2, the malware-indicative patterns 200 utilized by the example security application 114 are populated (e.g., via the server 126) by, for example, an entity associated with the security application 114 such as, for example, a developer of the security application 114.

The example scan manager 128 of FIG. 2 facilitates or manages scans (e.g., searches) of one or more elements of the computing platform 100 (e.g., one or more segments of the memory 112) for the malware-indicative patterns 200 to determine whether the computing platform 100 has a malware problem. In the illustrated example of FIG. 2, the scan manager 128 includes an offloader 202, a scan initiator 204, a trigger event analyzer 206, a scan pattern selector 208, a scan target selector 210, and a security services communicator 212. The example offloader 202 of FIG. 2 cooperates with the example graphics driver 116 of FIG. 1 to offload one or more of the scans to the example GPU 106 of FIG. 1. In the illustrated example of FIG. 2, the offloader 202 offloads the scans to the GPU 106 by default. Additionally or alternatively, the example offloader 202 of FIG. 2 can offload selective ones of the scans and/or selective aspects of certain scans to the GPU 106, while tasking the CPU 108 with executing other ones of the scans and/or other aspects of the certain scans. In some examples, the offloader 202 of FIG. 2 selects which one(s) of the scans to offload to the GPU 108 based on a current workload of the CPU 108 and/or a current workload of the GPU 106. Additionally or alternatively, the example offloader 202 of FIG. 2 selects which one(s) of the scans to offload to the GPU 108 based on a type and/or size of the scans. Additionally or alternatively, the scans are designed or configured (e.g., by the scan initiator 204, the scan pattern selector 208, and/or the scan target selector 210 as described below) specifically for execution on the GPU 106 or the CPU 108. In such examples, the offloader 202 detects such a configuration setting on the corresponding scan and designates the scan for offload to the GPU 106 or execution on the CPU 108 based on the detected setting. The example offloader 202 of FIG. 2 may base the selection of scan(s) for offloading to the GPU 106 on additional or alternative factors. As described below, the example offloader 202 of FIG. 2 and the corresponding utilization of the GPU 106 enable more aggressive scanning for the malware-indicative patterns 200. For example, by utilizing the GPU 106, the example offloader 202 of FIG. 2 enables more frequent scans, larger targets to be scanned, more patterns to be searched, etc.).

The example scan initiator 204 of FIG. 2 determines when a scan is to be performed and initiates the scans at the determined times. In some examples, the scan initiator 204 of FIG. 2 bases a frequency and/or timing of the scans on a current risk level of the computing platform 100. In such examples, the scan initiator 204 of FIG. 2 obtains and/or tracks the risk level of the computing platform 100 according to data provided by, for example, one or more firewalls, network appliances, event aggregators (e.g., McAfee's Joined Threat Intelligence (JTI)), one or more sensors, and/or any other suitable system monitor(s)). When the current risk level of the computing platform 100 is above a threshold, the example scan initiator 204 of FIG. 2 increases a frequency of the scans. When the current risk level of the computing platform is below the threshold, the example scan initiator 204 of FIG. 2 decreases or maintains the frequency of the scans. In some examples, intermediate thresholds are considered by the example scan initiator 204 of FIG. 2. In some examples, the scan initiator 204 of FIG. 2 gradually reduces the frequency of the scans if no threats are found in consecutive scans. Additionally or alternatively, the example scan initiator 204 of FIG. 2 bases a frequency and/or timing of the scans on a current load on the CPU 108, a current load on the GPU 108, and/or power availability.

Additionally or alternatively, the examples scan initiator 204 of FIG. 2 initiates scans in response to instructions from the trigger event analyzer 206. The example trigger event analyzer 206 of FIG. 2 monitors aspects of the computing platform 100 and/or receives data from components of the computing platform 100 related to, for example, one or more conditions that cause concern and, thus, warrant initiation of a scan. Example events that trigger a scan by the example security application 114 are discussed below.

The example scan pattern selector 208 of FIG. 2 selects one or more of the malware-indicative patterns 200 as the subject(s) of a scheduled scan. In some examples, the scan pattern selector 208 of FIG. 2 selects all of the malware-indicative patterns 200 based on, for example, the scan being scheduled for a time of relatively low activity on the computing platform 100. In some examples, the scan pattern selector 208 of FIG. 2 selects a random subset of the malware-indicative patterns 200 for the scheduled scan. In some examples, the scan pattern selector 208 of FIG. 2 selects a subset of the malware-indicative patterns 200 based on an event that triggered the scan as detected by the example trigger event analyzer 206. In some examples, the scan pattern selector 208 of FIG. 2 selects one or more of the malware-indicative patterns 200 based on information received from the example network interface driver 120 of FIG. 1. For example, as disclosed in detail below in connection with FIG. 4, the network interface driver 120 receives data from other computing platforms (e.g., the external computing platforms 400 of FIG. 4) indicating that, for example, a particular one of the malware-indicative patterns 200 is currently active, likely to be active soon, and/or recently active. As such, the example scan pattern selector 208 of FIG. 2 may select the corresponding one(s) of the malware-indicative patterns 200 according the data received via the network interface driver 120. Additionally or alternatively, the example network interface driver 120 of FIG. 2 receives malware-indicative patterns from one or more external computing platforms (e.g., the external computing platforms 400 of FIG. 4) and provides the received malware-indicative patterns to the example scan pattern selector 208. In some examples, the malware-indicative patterns received via the network interface driver 120 are added to the example malware-indicative patterns 200 of the example security application 114.

The example scan target selector 210 of FIG. 2 selects one or more targets to be scanned (e.g., for one(s) of the malware-indicative patterns 200 selected by the scan pattern selector 208). For example, the scan target selector 210 selects one or more particular segments of the memory 112, one or more segments of other memory, memory associated with one or more processes, memory associated with one or more threads, memory associated with one or more programs, memory ranges dedicated to one or more particular modules, memory ranges dedicated to one or more code segments, memory ranges dedicated to one or more data segments, heap memory, etc. In some examples, the scan target selector 210 of FIG. 2 bases the selection of the target memory on the current risk level of the computing platform 100 according to, for example, data provided by one or more firewalls, network appliances, event aggregators (e.g., McAfee's JTI), one or more sensors, and/or any other suitable system monitor(s). When the current risk level of the computing platform 100 is above a threshold, the example scan target selector 210 of FIG. 2 increases an amount of memory to be scanned. When the current risk level of the computing platform is below the threshold, the example scan target selector 210 of FIG. 2 decreases or maintains the amount of memory to be scanned. In some examples, intermediate thresholds are considered by the example scan target selector 210 of FIG. 2. In some examples, the scan target selector 210 of FIG. 2 gradually reduces the amount of memory to be scanned if no threats are found in consecutive scans. Additionally or alternatively, the examples scan target selector 210 of FIG. 2 selects target memory to be scanned based on instructions from the trigger event analyzer 206 of FIG. 2. Example events that trigger a scan by the example security application 114 are discussed below. Additionally or alternatively, the example scan target selector 210 of FIG. 2 selects target memory to be scanned based on information received from external computing platforms (e.g., the external computing platforms 400 of FIG. 4) via the example network interface driver 120. For example, as disclosed in detail below in connection with FIG. 4, the network interface driver 120 of FIG. 1 receives data from other computing platforms (e.g., the eternal computing platforms 400 of FIG. 4) indicating that, for example, a particular segment or a particular type of memory is particularly vulnerable to malware currently being detected on the external computing platforms and/or over a network. As such, the example scan target selector 210 of FIG. 2 may select the target memory to be scanned according the data received via the network interface driver 120.

When a scan has been configured (e.g., the time of execution is scheduled, the scan patterns to be searched are selected, and the target memory is selected), the example offloader 202 facilitates offloading of the scan task to the example GPU 106. In response, the GPU 106 executes the instructions corresponding to the configured scans. The example offloader 202 of FIG. 2 instructs the GPU 106 (e.g., via the graphics driver 116) to provide results of the scans to the security application 114. That is, the example security application 114 is informed that a scan found one or more of the malware-indicative patterns 200 or did not find any of the malware indicative-patterns 200. If one or more of the malware-indicative patterns 200 are found during the scans executed by the GPU 106, the example security application 114 takes any suitable remedial action(s). The example scan manager 128 of FIG. 2 includes a security services communicator 212 to cooperate with malware remediation component(s) configured to mitigate, alleviate, and/or remove malware from the computing platform 100.

In the illustrated example of FIG. 2, the security services communicator 212 conveys data associated with a malware detection to a security service (e.g., a malware removal tool or program) executed on the example computing platform 100, which takes the remedial action(s). Additionally or alternatively, the security services communicator 212 of FIG. 2 conveys the data associated with the malware detection to an external security service executed on a device external to the computing platform 100 (e.g., the server 126), which takes the remedial action(s). Additionally or alternatively, the security services communicator 212 of FIG. 2 conveys the data associated with the malware detection to another component of the security application 114, which takes the remedial action(s).

Accordingly, the example scan manager 128 of FIG. 2 facilitates scheduling, initiation, and configuration of one or more scans that may be offloaded to the GPU 106 of FIG. 1. As disclosed above, utilization of the GPU 106 reduces a burden on the CPU 108. Further, as disclosed above, the GPU 106 is often better suited (e.g., faster) than the CPU 108 for the type of scans (e.g., pattern searching scans) associated with the security application 114. Thus, the example offloader 202 of FIG. 2 and the corresponding utilization of the GPU 106 enables, for example, the scan initiator 204 to schedule and or initiate one or more actions (e.g., memory scans) more aggressively relative to the security application 114 only having access to the CPU 108. For example, while scans of memory can be performed at any time, scanning the memory for the malware-indicative patterns 200 at runtime is an effective method for detecting certain threats that may otherwise evade detection. For example, malware code and/or related artifacts can be unobfuscated (e.g., unpacked) while the corresponding threat is active and after the malware code executes. In contrast, when inactive, the malware is likely obfuscated (e.g., packed or encrypted) and, thus, more difficult to detect. Therefore, scanning the memory at runtime, while certain malware is active is beneficial. However, execution of memory scans via the CPU 108 at runtime may not be allowed by the computing platform 100 due to restrictions on CPU performance impact. Such a restriction is avoided by the example offloader 202 of FIG. 2 and the corresponding utilization of the GPU 106, thereby enabling the example scan initiator 204 of FIG. 2 to schedule and/or initiate memory scans at runtime (e.g., at all or more frequently than otherwise allowed).

Further, the example offloader 202 of FIG. 2 and the corresponding utilization of the GPU 106 enable, for example, the scan pattern selector 208 to more aggressively select patterns for searching during the scans. For example, the scan pattern selector 208 of FIG. 2 is able to select a greater number of the malware-indicative patterns 200 against which the security application 114 can protect the computing platform 100 because, for example, the GPU 106 is not subject to the restrictions imposed on the CPU 108 and because the GPU 106 is better suited (e.g., faster at scanning operations, more power efficient, and less likely to be occupied with other operations) for the pattern searching operations than the CPU 108.

Further, the example offloader 202 of FIG. 2 and the corresponding utilization of the GPU 106 enable, for example, the scan target selector 201 to more aggressively select targets to be searched for the malware-indicative patterns 200. For example, the scan target selector 210 of FIG. 2 is able to select a wider and/or greater number of memory address ranges to be scanned for the malware-indicative patterns 200 because, for example, the GPU 106 is not subject to the restrictions imposed on the CPU 108 and because the GPU 106 is better suited (e.g., faster at scanning operations, more power efficient, and less likely to be occupied with other operations) for the pattern searching operations than the CPU 108.

Further, the example offloader 202 of FIG. 2 and the corresponding utilization of the GPU 106 improve power consumption performance of the computing platform 114. For example, because the GPU 106 is designed to render and accelerate display information, which involves accessing and buffering large portions memory quickly, the GPU 106 performs large memory operations more efficiently. Thus, the amount of power consumed by the scans associated with the security application 114 is reduced via the utilization of the GPU 106 in lieu of the CPU 108 for at least one scan operation.

Further, the example offloader 202 of FIG. 2 and the corresponding utilization of the GPU 106 increase the number and/or type of events to which the security application 114 can respond (e.g., by initiating a memory scan). As such, the example trigger event analyzer 206 of FIG. 2 can monitor the computing platform 100 for a greater number of events that can be used by the scan initiator 204 to initiate a scan. For example, the trigger event analyzer 206 of FIG. 2 triggers a memory scan in response to suspicious network traffic on the example computing platform 100. Examples of suspicious network traffic include rapid requests to a large volume of varied IP address, traffic to unknown or untrusted destinations, and/or IRC (Internet Relay Chat) communication protocol communication in an environment in which IRC protocol communication is unusual or anomalous. In such examples, the trigger event analyzer 206 of FIG. 2 responds to the suspicious outgoing network traffic by triggering a scan of sending processes (e.g., an application associated with conveyance of the suspicious responses from the computing platform 100) and/or critical system processes. Additionally or alternatively, example suspicious network traffic includes receiving data from unknown or untrusted sources. In such examples, the trigger event analyzer 206 of FIG. 2 responds to the suspicious incoming network traffic by triggering a scan of receiving processes (e.g., an application associated with receipt of the suspicious data) and/or critical system processes.

Additionally or alternatively, the example trigger event analyzer 206 of FIG. 2 triggers a memory scan in response to certain web browser events. An example web browser event to be monitored by the example trigger event analyzer 206 of FIG. 2 includes completion of the web browser rendering a web page from an unknown or untrusted source. Another example web browser event to be monitored by the example trigger event analyzer 206 of FIG. 2 includes a browser helper object (BHO) or plug-in being loaded. In such examples, the trigger event analyzer 206 of FIG. 2 responds to the browser activity by triggering a scan of the web browser process.

Additionally or alternatively, the example trigger event analyzer 206 of FIG. 2 triggers a memory scan in response to a document being loaded in, for example, a document reader and/or editor. In some examples, documents of particular concern include instances in which active content, such as macro processing, is enabled. In such examples, the trigger event analyzer 206 responds to the document loading by triggering a scan of the memory associated with the host process that loaded the document.

Additionally or alternatively, the example trigger event analyzer 206 of FIG. 2 triggers a memory scan in response to a script being executed. In such examples, the trigger event analyzer 206 of FIG. 2 responds to the script execution by triggering a scan of the process that owns the script and/or critical system processes.

Additionally or alternatively, the example trigger event analyzer 206 of FIG. 2 triggers a memory scan in response to a suspicious file access attempts from, for example, on-access file monitor(s). Example suspicious file access attempts include attempts to access security application files. Another example suspicious file access event is a rootkit allowing the corresponding files to appear in a directly listing, but denying a user and/or security software access to read those files. In such examples, the trigger event analyzer 206 of FIG. 2 responds to the suspicious file access events by triggering a scan of the process responsible for the file access attempts.

Additionally or alternatively, the example trigger event analyzer 206 of FIG. 2 triggers a memory scan in response to suspicious attempts to alter a registry. Example suspicious attempts to alter the registry include attempts to alter a registry value of a security application, a registry value of virtualization software, and/or a registry value of a rootkit. In such examples, the trigger event analyzer 206 of FIG. 2 responds to the suspicious attempts to alter the registry by triggering a scan of memory associated with the corresponding calling process.

Additionally or alternatively, the example trigger event analyzer 206 of FIG. 2 triggers a memory scan in response to suspicious attempts to alter critical disk regions. Example critical disk regions include the MBR (master boot record), VBR (volume boot record), or EFI (extensible firmware interface) system partition. In such examples, the trigger event analyzer 206 of FIG. 2 responds to the suspicious attempts to alter the critical disk regions by triggering a scan of memory associated with the corresponding calling process.

Additionally or alternatively, the example trigger event analyzer 206 of FIG. 2 triggers a memory scan in response to security events detected by external security application(s). Example externally detected security events include sensors and/or monitors such as McAffee's JTI. In such examples, the trigger event analyzer 206 of FIG. 2 responds to the external security events by triggering a scan of the corresponding memory, triggering a fully system scan, and/or changing an aggressiveness of current or scheduled scans.

Additionally or alternatively, the example trigger event analyzer 206 of FIG. 2 triggers a memory scan in response to processes establishing a genealogy. For example, a web browser launching a first child process and a second subsequent process causes the trigger event analyzer 206 of FIG. 2 to trigger a scan for remote code execution exploits that were spawned as a results of accessing malicious web pages. Scanning of the web browser process itself may result in identification of exploit code lingering in memory, while scanning of the spawned process with the knowledge of how the executable was launched may provide additional intelligence about the attack. For example, application that user choose to run through a web browser may follow a specific process path naming convention, while exploits result in unexpected paths.

Additionally or alternatively, the example trigger event analyzer 206 of FIG. 2 triggers a memory scan in response to application parameters being passed during process creation. For example, a native tool typically used for development and testing (e.g., bcdedit.exe for Windows®) may pass parameters (e.g., bcdedit.ext—set TESTSIGNING ON). In such instances, this arrangement can be abused by, for example, rootkit distributors for bypassing driver signing enforcement protection. As such, the example trigger event analyzer 206 of FIG. 2 triggers a scan in response to detecting such events. In some examples, if page change notification is available (e.g., via TMSL or EPT in an Intel® architecture), scanning can be limited to memory pages that have changed since the last scan and/or processes containing pages that have been changed since the last scan.

Additionally or alternatively, the example trigger event analyzer 206 of FIG. 2 triggers a memory scan in response to suspicious user actions. Example suspicious user actions include manual execution of applications from an Internet facing program, such as the execution of email attachments. Another example suspicious user action includes a user following a hyperlink sent in email or an instant message, which leads to a website categorized as unknown or unclassified, or a brand new site. In such examples, the trigger event analyzer 206 of FIG. 2 responds to the suspicious user action by triggering scanning for browser-based exploits in memory.

As disclosed above, the example scan manager 128 of FIG. 2 provides a plurality of benefits to the example computing platform 100. While these benefits are realized are any suitable scenario, an example scenario includes an obfuscated (e.g., packed) file that does not have a recognizable signature being loaded onto the computing platform 100 (e.g., via email attachment, drive-by download or other mechanism). That is, the obfuscated file is a non-trusted or "gray list" file. If such a file contains malware, the malware may go undetected due to the file being obfuscated (and an inability to unpack the file) and/or polymorphism of the file. That is, memory scans performed when the file remains obfuscated may not result in a malware detection. Thus, the file may be launched and may be active for a significant period of time in systems having sporadic memory scans. In contrast, the example scan manager 128 enables continuous and/or frequent memory scanning that will detect the file rapidly when the file is unpacked. For example, the file entering the computing platform 100 as an obfuscated, untrusted source is designated (e.g., by the trigger event analyzer 206) as a "gray list" file that is scanned immediately (e.g., without delay or in real time) when the file is unpacked.

Another example scenario in which the benefits provided by the example scan manager 128 of FIG. 2 are realized is file-less malware being loaded onto the computing platform 100. In such instances, the malware becomes active on the computing platform 100 via a browser exploit, such as a buffer overflow. Because the malware is file-less, no file is written to the disk and, thus, no file scan takes place in known systems. In contrast, the example scan manager 128 of FIG. 2 enables continuous and/or frequent memory scanning that will detect the exploit due to, for example, an ability to continuously monitor high-risk processes such as operating system services.

Another example scenario in which the benefits provided by the example scan manager 128 of FIG. 2 are realized is an obfuscated Advanced Persistent Threat (APT) or time-based malware being loaded into the memory 212 of the computing platform 100 without detection from a file-based scanner. The APT may not immediately unpack or decrypt the payload containing the malware. After a certain period of time or other trigger, the APT payload is unpacked or decrypted for execution. Thus, the file may be launched and may be active for a significant period of time in systems having sporadic memory scans. In contrast, the example scan manager 128 of FIG. 2 enables continuous and/or frequent memory scanning that will detect the APT rapidly when the file is unpacked or decrypted.

Another example scenario in which the benefits provided by the example scan manager 128 of FIG. 2 are realized is a user navigating a web browser to a website that unknown or untrusted. Because the example scan manager 128 of FIG. 2 enables continuous and/or frequent memory scanning and prioritization of high-risk processes such as web browsers, the malicious website is immediately blacklisted and the browser is immediately isolated and/or terminated.

While an example manner of implementing the scan manager 128 of FIG. 1 is illustrated in FIG. 2, one or more of the elements, processes and/or devices illustrated in FIG. 2 may be combined, divided, re-arranged, omitted, eliminated and/or implemented in any other way. Further, the example offloader 202, the example scan initiator 204, the example trigger event analyzer 206, the example scan pattern selector 208, the example scan target selector 210, the example security services communicator 212 and/or, more generally, the example scan manager 128 of FIG. 2 may be implemented by hardware, software, firmware and/or any combination of hardware, software and/or firmware. Thus, for example, any of the example offloader 202, the example scan initiator 204, the example trigger event analyzer 206, the example scan pattern selector 208, the example scan target selector 210, the example security services communicator 212 and/or, more generally, the example scan manager 128 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example offloader 202, the example scan initiator 204, the example trigger event analyzer 206, the example scan pattern selector 208, the example scan target selector 210, the example security services communicator 212 and/or, more generally, the example scan manager 128 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example scan manager 128 of FIG. 1 may include one or more elements, processes and/or devices in addition to, or instead of, those illustrated in FIG. 2, and/or may include more than one of any or all of the illustrated elements, processes and devices.

Figure 3:
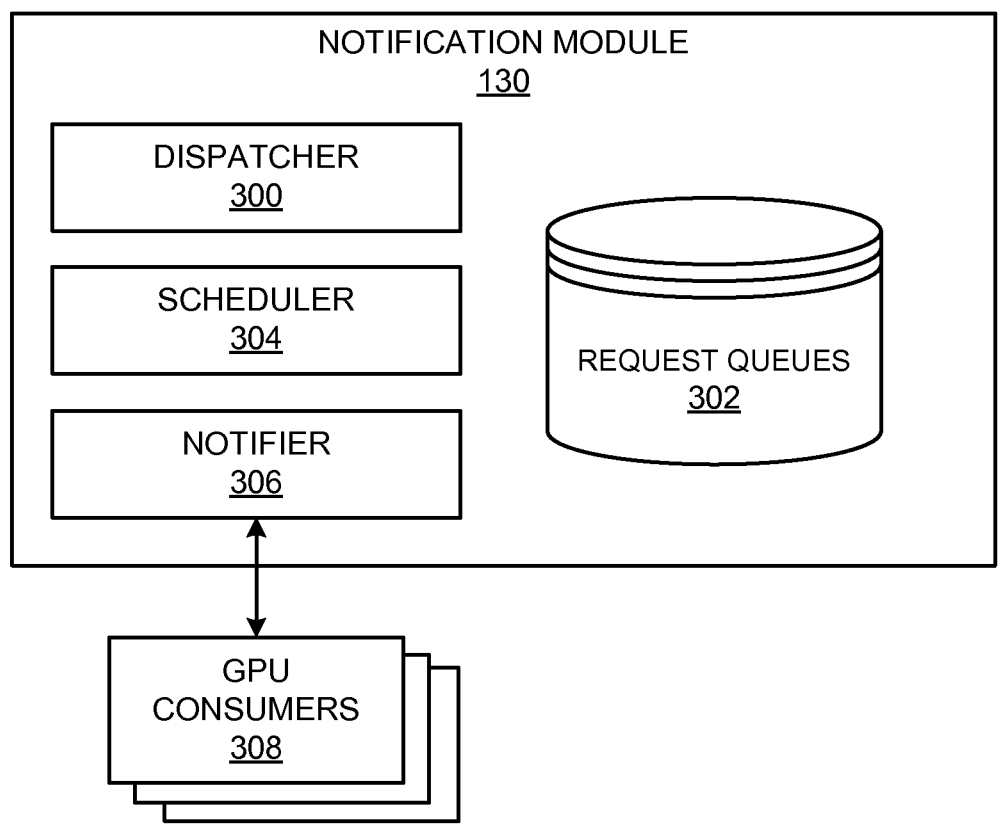
FIG. 3 is a block diagram of an example implementation of the example notification module of FIG. 1.

FIG. 3 is a block diagram of an example implementation of the example notification module 130 of FIG. 1. The example notification module 130 of FIG. 3 includes a dispatcher 300 to receive requests from consumers of the GPU 106 and to add the received requests to, for example, a suitable one of a plurality of request queues 302. For example, the dispatcher 300 of FIG. 3 receives requests associated with native operations of the GPU 106 such as, for example, display rendering tasks from applications (e.g., the non-security application 118 of FIG. 1) that involve display of such data. In response, the example dispatcher 300 of FIG. 3 adds the display rendering tasks to a corresponding one (e.g., a queue dedicated to display rendering tasks) of the example request queues 302 of FIG. 3.

Additionally, the example dispatcher 300 of FIG. 3 receives request associated with non-native operations of the GPU 106 such as, for example, security tasks that involve pattern matching scanning from the example security application 114 of FIGS. 1 and/or 2. In response, the example dispatcher 300 of FIG. 3 adds the security tasks to the corresponding one (e.g., a queue dedicated to security tasks) of the example request queues 302 of FIG. 3. While the example of FIG. 1 includes the example security application 114 and the non-security application 118, any suitable number or combination of application(s) and/or corresponding driver(s) can interact with the GPU 106 via the example graphics driver 116. In the illustrated example of FIG. 3, the dispatcher 300 extracts or otherwise obtains contextual data (e.g., process identifier, thread identifier, etc.) associated with the task and includes the contextual data with the entry in the request queues 302. Further, the example request queues 302 of FIG. 3 are configured in any suitable manner. For example, different types of security tasks can each be assigned a dedicated one of the request queues 302.

The example notification module 130 of FIG. 3 includes a scheduler 304 to schedule tasks to be executed on the GPU 106. The example scheduler 304 of FIG. 3 implements scheduling logic to order the tasks of the request queues 302. Example factors and/or conditions considered in connection with the scheduling logic of the example scheduler 304 include queue depths, priority levels assigned to the individual tasks, a time slice to use for preemption, and/or any other suitable factor. The example GPU 106 executes the tasks as ordered in the request queues 302.

Additionally, the example scheduler 304 of FIG. 3 obtains the status of the tasks being executed (e.g., in parallel) on the GPU 106. For example, the scheduler 304 of FIG. 3 determines whether a particular task has been initiated, has been preempted, has been completed, etc. In the illustrated example of FIG. 3, the scheduler 304 detects that the status of the particular task has transitioned from one state to another. Additionally, the example scheduler 304 of FIG. 3 tracks the contextual information of the GPU 106 in case execution on the GPU 106 is preempted and the context of the GPU 106 needs to be restored to a point of last execution.

In the illustrated example of FIG. 3, when the scheduler 304 detects a particular status of a task or that the task has transitioned from one state to another state, the example scheduler 304 conveys data indicative of the detection to a notifier 306 of the example notification module 130. The example notifier 306 of FIG. 3 receives the status information and communicates the information to, for example, a requester of such information. In the illustrated example of FIG. 3, the notifier 306 receives requests for notifications from, for example, consumers 308 of the GPU 106. However, the example notifier 306 of FIG. 3 can receive and address requests from any suitable application or component. The GPU consumers 308 of FIG. 3 include, for example, the security application 114 which requests notifications regarding a status of a security task offloaded to the GPU 106. Additionally or alternatively, the GPU consumers 308 of FIG. 2 include the non-security application 118 which requests notifications regarding a status of a non-security task offloaded to the GPU 106. The example GPU consumers 308 of FIG. 3 include any suitable application, program, and/or component. In some examples, the requests received from the GPU consumers 308 include a specific status (e.g., preempted, initiated, completed, etc.) and/or a specific event (e.g., preemption) for which a callback is desired. The example notifier 306 of FIG. 3 tracks the received request via, for example, a list of notification requests. The example notifier 306 of FIG. 3 meets the notification requests by following the specifics of each request in response to the information received from the scheduler 304 regarding statuses and/or events associated with tasks being executed by the GPU 106. In some examples, the notifier 306 extracts metadata associated with the task and/or the GPU 106 and includes the same in the communication to the requested component.

The notifications provided by the example notifier 306 of FIG. 3 are conveyed to the corresponding one of the GPU consumers 308 (e.g., the security application 114) securely such that the information is not available to untrusted components. In the illustrated example of FIG. 3, the notifier 306 conveys the notification and the related data to the requesting components (e.g., the GPU consumers 308) at a secure privilege level (e.g., a privilege level enjoyed only by trusted components, such as ring 0 of the Intel architecture, as opposed to ring 3 which is not enjoyed by untrusted components). Additionally or alternatively, the example notifier 306 of FIG. 3 establishes a mutual authentication with the requesting components (e.g., the GPU consumers 308) before the information can be conveyed to the requesting components. Additional or alternative authentication measures can be taken.

As described above, in some instances, the example security application 114 of FIGS. 1 and/or 2 is the component receiving status information from the example notifier 306 of FIG. 3. In some examples, the security application 114 uses the received status information to implement and/or trigger one or more security actions. For example, in response to the example notifier 306 of FIG. 3 informing the security application 114 that a security task was preempted by a particular process, the example trigger event analyzer 206 of FIG. 2 triggers one or more security actions such as, for example, a scan of memory associated with the particular process that preempted the security task, a full memory scan, a restriction on the particular process. Further, continuous or repeated preemption by an untrusted process can be considered a hostile behavior and defensive remediation (e.g., via the example security services communicator 212) against the untrusted process is triggered by the example security application 114. In some examples, the security application 114 uses the notification information provided by the example notifier 306 of FIG. 3 in additional or alternative manners and/or for additional or alternative purposes. For example, the example scan initiator 204 of FIG. 2 may use the status information to measure progress of a security task being executed on the GPU 106 and/or may consider processing delays when scheduling a security task. Additionally or alternatively, the example scan target selector 210 of FIG. 2 may use the process identifier (e.g., as provided by the example notifier 306) of a process or thread that preempted a security task being executed on the GPU 106 to select memory associated with that process or thread for a scan.

While an example manner of implementing the notification module 130 of FIG. 1 is illustrated in FIG. 3, one or more of the elements, processes and/or devices illustrated in FIG. 3 may be combined, divided, re-arranged, omitted, eliminated and/or implemented in any other way. Further, the example dispatcher 300, the example scheduler 304, the example notifier 306 and/or, more generally, the example notification module 130 of FIG. 3 may be implemented by hardware, software, firmware and/or any combination of hardware, software and/or firmware. Thus, for example, any of the example dispatcher 300, the example scheduler 304, the example notifier 306 and/or, more generally, the example notification module 130 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example dispatcher 300, the example scheduler 304, the example notifier 306 and/or, more generally, the example notification module 130 of FIG. 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example notification module 130 of FIG. 1 may include one or more elements, processes and/or devices in addition to, or instead of, those illustrated in FIG. 3, and/or may include more than one of any or all of the illustrated elements, processes and devices.

Figure 4:
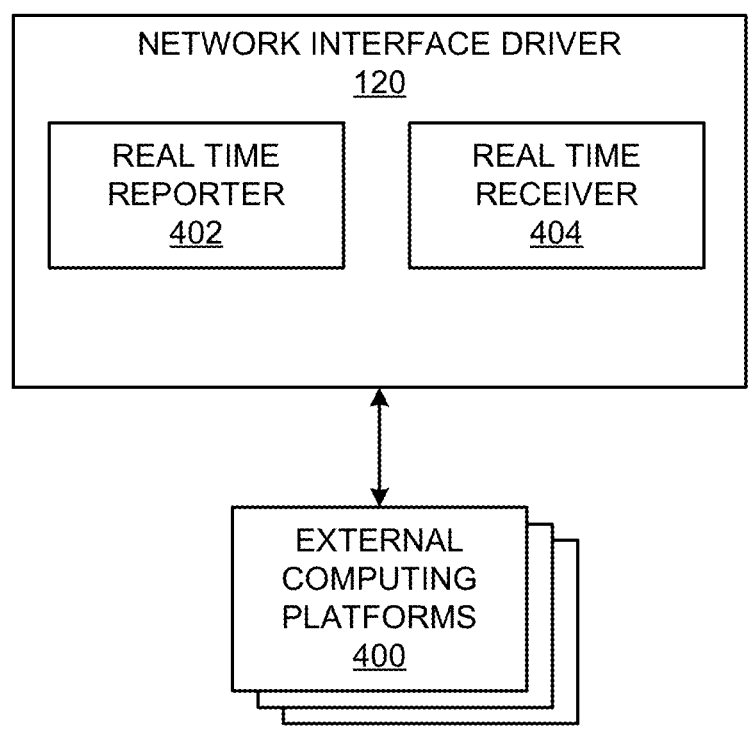
FIG. 4 illustrates channels associated with the example network interface driver of FIG. 1.

FIG. 4 is a block diagram of an example implementation of the example network interface driver 120 of FIG. 1. The example network interface driver 120 of FIG. 4 improves an ability of the example computing platform 100 detect and/or remediate malware. Some known systems include aggregation of data across a plurality of device to flag anomalous traffic and, using the flagged traffic information, block a particular host or source of the suspicious network traffic. However, such known systems do not remove the threat from the host or source and, thus, the malware on the host or source continues to infect the host or source. That is, even if administrators of such systems configure the network to deny all outbound traffic from an infect host, such an approach would not halt the malware execution. Additionally, such an approach may significantly diminish the productive value of the system for an intended use. Moreover, while the administrator may initiate a scan on the host in response to the host being flagged, the initiation of the scan in known systems does not include sharing of the specific pattern or suspicious traffic that triggered the flag. That is, scans initiated by known systems are likely to use different detection logic than the currently detected patterns. Further, malware on portable devices (e.g., a smart phone, a tablet, a notebook, etc.) using such an approach to security can simply wait until the user connects to a different network to exfiltrate data or carry out payloads of the malware.

The example network interface driver 120 of FIG. 4 enables the example computing platform 100 and security services (e.g., the security application 114) associated with the computing platform 100 to obtain knowledge of malware from external computing platforms 400 for use in addressing malware on the example computing platform 100. Additionally, the example network interface driver 120 of FIG. 4 conveys knowledge of malware to the external computing platforms for use in addressing malware on the external computing platforms 400. Thus, the example network interface driver 120 of FIG. 4 and similar components installed on the individual ones of the external computing platforms 400 enable a sharing of information related to malware that is likely useful in preventing the malware from impacting the computing platforms 100, 400. In the illustrated example, the external computing platforms 400 include, for example, endpoint devices, servers, network aggregators, and/or any other suitable computing platform.

Notably, the example network interface driver 120 of FIG. 4 shares information with the external computing platforms 400, and vice versa, in real time (e.g., without delay). For example, when one of the example external computing platforms 400 detects a suspicious pattern (and/or other type of malware indication), the example network interface driver 120 of FIG. 4 receives information regarding the suspicious pattern immediately. To provide the information to the external computing platforms 400, the example network interface driver 120 of FIG. 4 includes a real time reporter 402. For example, when the example security application 114 detects malicious code, the example security application 114 (e.g., via the security services communicator 212) cooperates with the example real time reporter 402 to facilitate conveyance of the corresponding information to, for example, the external computing platforms 400. In some examples, the information conveyed via the real time reporter 402 of FIG. 4 includes instructions or indication of, for example, a type of memory and/or process that should be a target of a corresponding scan (e.g., by the example external computing platforms 100).

Further, to receive the information from the external computing platforms 400, the example network interface driver 120 of FIG. 4 includes a real time receiver 404. By sending and receiving the malware-indicative information in real time (e.g., without delay subject to, for example, transmission and/or processing times), the example real time reporter 402 of FIG. 4 and/or the example real time reporter 404 of FIG. 4 increase the ability of, for example, the security application 114 of FIGS. 1 and/or 2 to detect the corresponding malware. In particular, the malware-indicative information received at the real time receiver 404 of FIG. 4 corresponding to active malware. Put another way, because the malware-indicative information is received at the example real time receiver 404 of FIG. 4 in real time, the malware-indicative information likely corresponds to malware that is being executed on a network including the example computing platform 100. As such, a memory scan for the received malware-indicative information is more likely to detect the malware because the malware is active and, thus, unpacked and/or unobfuscated.

In such instances, the example trigger event analyzer 206 of FIG. 2 can trigger an immediate scan of, for the example, one or more segments of the memory 112 and the example scan target selector 210 of FIG. 2 can utilize the received malware-indicative information as a target for the memory scan. Additionally or alternatively, the example scan initiator 204 of FIG. 2 can prioritize initiation of the memory scan based on the information received at the example real time receiver 404 of FIG. 4. Additionally or alternatively, the example security application 114 of FIGS. 1 and/or 2 can utilize the information received at the example real time receiver 404 of FIG. 4 to adjust or alter scheduled, pending, and/or current memory scans. For example, the example scan initiator 204 of FIG. 2 can re-prioritize one or more memory scans to execute ahead of schedule.

As disclosed above, the example network interface driver 120 of FIG. 4 provides a plurality of benefits to the example computing platform 100. While these benefits are realized are any suitable scenario, an example scenario includes a network worm being detected by one or more of the example external computing platforms 400 and/or the computing platform 100 itself. For example, the external computing platforms 400 and/or the computing platform 100 may include a gateway or security appliance (e.g., an Intrusion Prevention System (IPS), a firewall, a proxy, etc.) that detects high volume IP scans (e.g., multiple rapid requests to sequential foreign IP addresses) via, for example, profiling of outbound network traffic. For example, the IP addresses in question can be foreign (e.g., in terms of the network and/or geography) to the corresponding one of the external computing platforms 400 and/or the computing platform 100. In such instances, the example real time reporter 402 of FIG. 4 associated with the computing platform that detected the worm makes the IP addresses available to the other computing platforms as a signature to look for on the individual machines. In some examples, such a scenario involves IP addresses requested by the computing platform 100 being detected as suspicious on one or more of the external computing platforms 400 and the one or more external computing platforms 400 feeding the suspicious IP address signature back to the computing platform 100 to be the subject of a scan.

Another example scenario involves detection of an Internet Relay Chat (IRC) bot. For example, a network device may identify the IRC protocol being used to attempt to connect to a remote server and channel with a given username. In some instances, such a detection violates one or more rules. In response, the example real time reporter 402 of FIG. 4 associated with the computing platform that detected the violation conveys the corresponding details, such as the username and/or an IP address, to other computing platforms such that the other computing platforms can look for the username being used in a similar manner.

Another example scenario involves detection of foreign HTTP user-agents across multiple nodes. For example, malware may use a custom user-agent when sending HTTP requests. A single system with a foreign user-agent may not be cause to scan for malware. However, observation of multiple nodes sending such traffic can exceed a threshold for scanning to occur. In such instances, a network security device may identify identical but foreign HTTP requests made by different network nodes. In such instances, the example real time reporter 402 of FIG. 4 associated with the computing platform that detected the foreign HTTP requests can convey one or more details, such as a portion of a user-agent string, to other computing platforms. The information can be utilized to better detect the corresponding malware on the other computing platforms.

Thus, the pattern searching based on malware-indicative information received at, for example, real time receiver 404 of FIG. 4 may include scanning memory for relevant strings (ANSI and/or Unicode) and/or byte patterns. If the scanning returns a match, the offending process or thread can be identified by mapping the corresponding memory to the offending process. As described above in connection with FIG. 2, the example security services communicator 212 receives results of the memory scans and can take any suitable remedial action. Additionally or alternatively, information received by the example real time receiver 404 of FIG. 4 may provide the criteria associated with suspicious network traffic to, for example, a network filter driver that scans data crossing the example network interface 110 of FIG. 1.

While an example manner of implementing the network interface driver 120 of FIG. 1 is illustrated in FIG. 4, one or more of the elements, processes and/or devices illustrated in FIG. 4 may be combined, divided, re-arranged, omitted, eliminated and/or implemented in any other way. Further, the example real time reporter 402, the example real time receiver 404 and/or, more generally, the example network interface driver 120 of FIG. 4 may be implemented by hardware, software, firmware and/or any combination of hardware, software and/or firmware. Thus, for example, any of the example real time reporter 402, the example real time receiver 404 and/or, more generally, the example network interface driver 120 of FIG. 4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example real time reporter 402, the example real time receiver 404 and/or, more generally, the example network interface driver 120 of FIG. 4 is/are hereby expressly defined to include a tangible computer readable storage device or storage disk such as a memory, a digital versatile disk (DVD), a compact disk (CD), a Blu-ray disk, etc. storing the software and/or firmware. Further still, the example network interface driver 120 of FIG. 1 may include one or more elements, processes and/or devices in addition to, or instead of, those illustrated in FIG. 4, and/or may include more than one of any or all of the illustrated elements, processes and devices.

Figure 5:
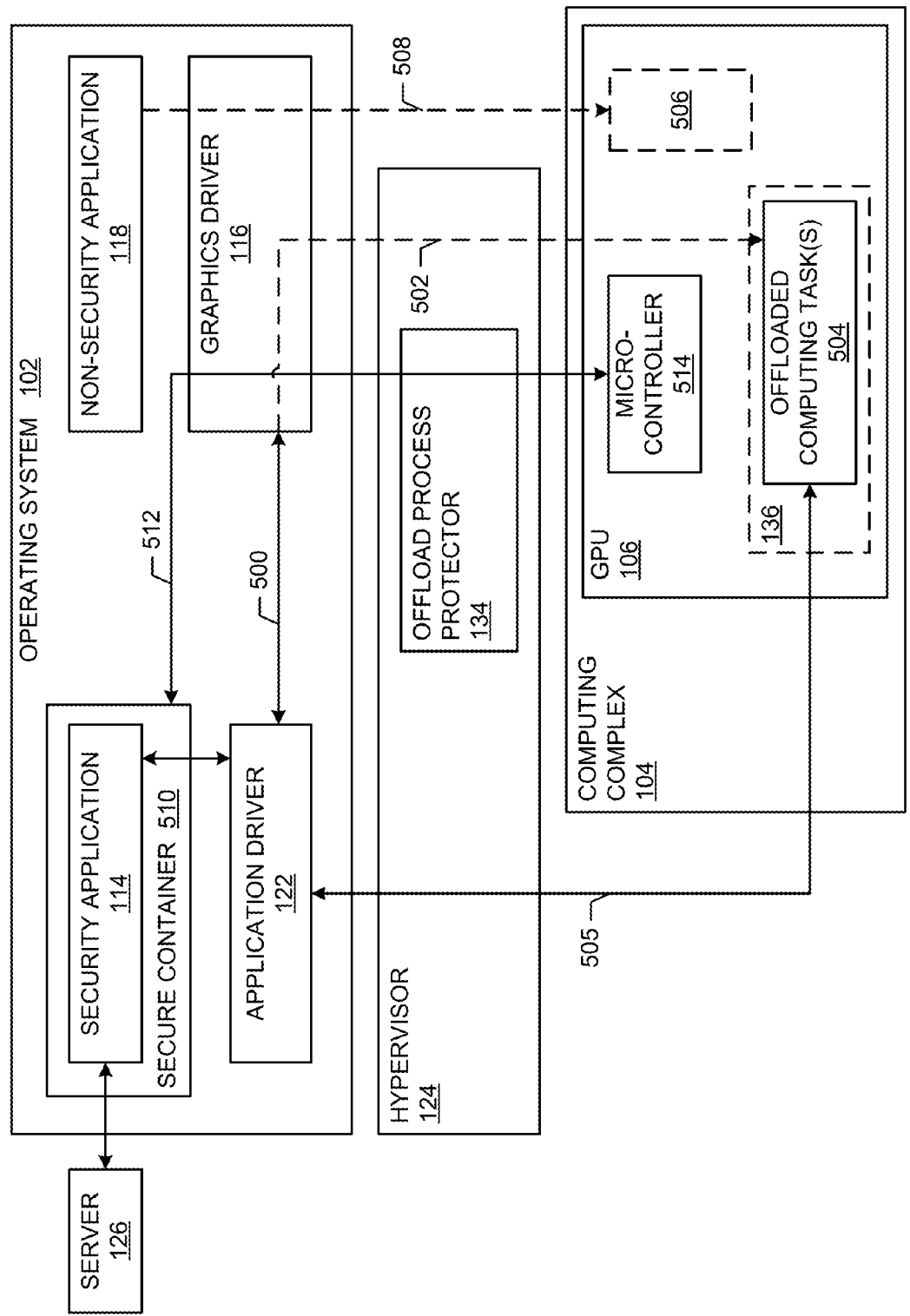
FIG. 5 is an illustration of example protections provided by the example authentication module of FIG. 1, the application driver of FIG. 1, the offload process protector of FIG. 1, and the hypervisor of FIG. 1

FIG. 5 illustrates example protections provided by the example authentication module 132, the example application driver 122, the example hypervisor 124 and the example offload process protector 134 of FIG. 1. In the example of FIG. 5, the graphics driver 116 controls interactions between components of the OS 102 and the GPU 106. For example, the graphics driver 116 controls interactions between the non-security application 118, which may include a display function that utilizes the GPU 106, and the GPU 106. Additionally, the example graphics driver 116 controls interactions between the example security application 114 of FIGS. 1 and/or 2 and the GPU 106. As described above, the example security application 114 offloads one or more tasks (e.g., security tasks such as memory scans) to the GPU 106 via the example graphics diver 116. While the example of FIG. 5 includes the security application 114 and the non-security application 108, any suitable number of applications can interact with the GPU 106 via the example graphics driver 116. Further, while the following describes the security application 114 and security tasks offloaded to the GPU 106 by the security application 114, any suitable type(s) of application(s) can utilize the example protections provided by the example authentication module 132, the example application driver 122, the example hypervisor 124 and/or the example offload process protector 134 to securely offload one or more computing tasks to the example GPU 106.

In the example of FIG. 5, the security application 114 interacts with (e.g., communicates data to) the GPU 106 via the example application driver 122 (and the example graphics driver 116). Thus, when the example security application 114 of FIG. 1 offloads a task to the example GPU 106, the task is offloaded via communications between the example graphics driver 116 and the example application driver 122. In known systems, unmonitored access to GPUs provides applications (e.g., malicious code such as malware) to kernel level code. In such instances, malware can more easily (e.g., relative to the privileged environment including the CPU) modify and/or destroy code being executing by the GPU 106. In contrast to such known systems, the example authentication module 132, the example application driver 122, the example hypervisor 124 and/or the example offload process protector 134 provide a secure offload process and secure execution of the offloaded computing task(s). In particular, a trusted channel 500 is established between the example graphics driver 116 and the example application driver 122. With the example trusted channel 500 of FIG. 5 in place, computing tasks and/or other types of data received at the example graphics driver 116 from the example application driver 122 are authenticated (e.g., verified as received from trusted source via mutual authentication procedure(s)). Put another way, the computing task(s) and/or other type(s) of data received from the example application driver 122 via the example trusted channel 500 of FIG. 5 are confirmed to have originated at a trusted source (e.g., the example security application 114) and, thus, to not pose a threat to the example computing platform 100. The example trusted channel 500 of FIG. 5 established between the graphics driver 116 and the example application driver 122 provides a secure tunnel 502 from the application driver 122 to the example GPU 106. As such, the example trusted channel 500 of FIG. 5 established between the example application driver 122 and the example graphics driver 116 ensures that malicious computing task(s) are not conveyed to the otherwise vulnerable GPU 106. An example implementation of the example trusted channel 500 of FIG. 5 and the corresponding example secure tunnel 502 of FIG. 5 is disclosed in detail below in connection with FIGS. 6 and 7.

In the illustrated example of FIG. 5, the hypervisor 124 of the example computing platform 100 provides a privilege level protection scheme for offloading computing task(s) 504 to the example GPU 106. In the illustrated example of FIG. 5, the hypervisor 124 supplements the protection provided by the example trusted channel 500 that provides the secure tunnel 502. In some examples, the hypervisor 124 is not implemented and the example computing platform 100 relies on the example trusted channel 500 to ensure the integrity of the offloading process. In some examples, the hypervisor 124 of FIG. 1 is implemented without the example trusted channel 500 of FIG. 5 being in place. For example, in addition to or in lieu of the example secure tunnel 502 provided via the example graphics driver 116, the hypervisor 124 can monitor a communication path 505 directly mapped (e.g., using Intel Virtualization Technology for Directed I/O (VT-d)) between the application driver 122 and the GPU 106 and the offloaded computing task(s) 504. In some such instances, at least some of the components of the graphics driver 116 associated with the secure tunnel 502 are not utilized to in connection with the direct communication path 505. Thus, the example hypervisor 124 and the example trusted channel 500 of FIG. 5 can be used individually and/or in combination to protect the example offloaded computing task(s) 504.

In the illustrated example of FIG. 5, the hypervisor 124 includes the offload process protector 134. In the illustrated example of FIG. 5, the hypervisor 124 and/or the example offload process protector 134 are implemented by a memory protected hypervisor (e.g., Trusted Memory Services Layer (TMSL) provided by Inter). As the example offload process protector 134 of FIG. 5 is implemented via the hypervisor 124, the example offload process protector 134 of FIG. 5 has a highest privilege level (e.g., ring-1 privilege level) of the example computing platform 100. Having the highest privilege level enables the example offload process protector 134 to monitor, for example, the isolated region of memory 136. In the illustrated example, the hypervisor 124 creates the isolated (e.g., not visible to the OS 102) region of memory 136 and designates the isolated region of memory 136 for execution of the offloaded computing task(s) 504. As such, the offloaded computing task(s) 504 are isolated from other, unprivileged regions of memory to be utilized by traditional GPU tasks, such as image rendering. As the example offload process protector 134 monitors the example isolated region of memory 136, the example offload process protector 134 protects the computing platform 100 against attempted access by code having any privilege level. For example, in Intel® architectures, the example offload process protector 134 of FIG. 5 can detect attempted access of the isolated memory 136 by a program have ring-0, ring-1, ring-2, and/or ring-3 privilege level. Thus, even a program at ring-0 privilege level attempting to access the isolated memory 136 is detected by the example offload process protector 134, which has hypervisor privileges. As such, the example offload process protector 134 acts as a gatekeeper for the isolated memory 136. Because certain malware executes in ring-0 of the Intel® privilege level architecture, the example offload process protector 134, having the hypervisor privilege, ensures that even malware operating on ring-0 cannot access the offloaded computing task(s) 504.

In some examples, when setting up the isolated memory 136, the hypervisor 124 configures the isolated memory 136 using Shared Virtual Memory (SVM). SVM is a parallel page table structure designed for the GPU 106 to directly access host memory. SVM provides additional or alternative protection to the offloaded computing tasks. For example, SVM provides access control properties than can limit the GPU's 106 access to memory, specifically allowing reads of pages of memory but not write access. In the illustrated example in which the GPU 106 is scanning for malware, write access to host memory is not needed. Additionally, SVM allows selective access to memory. For example, when configuring the isolated memory 136 using SVM, the example hypervisor 124 can allow some pages to be inaccessible to the GPU 106 such as, for example, pages of memory that contain secret data and/or keying material that should not be disclosed to any third party. Additionally, SVM allows specific memory to be mapped to the GPU 106 that may not be accessible to, for example, guest operating systems, compromised operating systems, malware, and/or other devices. The specific memory may contain the code and/or data that the GPU 106 needs to perform a protected workload (e.g., offloaded computing tasks). Additionally SVM allows the GPU 106 to map all of host memory. This allows a memory scanner running in the GPU 106 to access host memory without involving, for example, the CPU 108, a virtual machine monitor, and/or drivers to remap or copy buffered memory on demand. This increases the autonomy of scanning performed by the GPU 106 while reducing the CPU cycles consumed by servicing the GPU 106. Access to all host memory enables the GPU 106 to query other structures resident in memory that track memory accesses from the CPU 108. For example, a Page Miss Log (PML) provides a list or recently modified pages in memory. These pages would be of particular interest to a memory scanner because they have changed and should be re-scanned. Pages that have not changed or been recently accessed may not need to be rescanned as they have not been altered. Additionally or alternatively, Extended Page Tables and OS page Tables contain bits (e.g., Access/Dirty bits) that can be used for determining recently accessed memory. Additionally or alternatively, devices that recently access memory can be identified. For example, virtualization tables for other devices interacting with the computing platform 100 may contain bits that track whether a device attempted to access memory, read or write access, and which memory address was addressed. Thus, by utilizing SVM tables in connection with the GPU 106, the example hypervisor 124 of FIG. 1 enables the GPU 106 to appropriately access memory (e.g., for read only scanning operations) and protects those tables from alteration (e.g., by malicious entities such as malware, APTs, etc.). In some examples, the hypervisor 124 protects the SVM table by configuring VT-d tables to prevent access to those tables by other devices and by configuring Extended Page Tables (EPTs) to prevent access to the protected SVM table by guest operating systems and any potential malware they may contain. In some examples, the GPU 106 is granted read-only access to the protected SVM table so that the hardware of the GPU 106 correctly accesses and/or maps host memory for the purpose of scanning for malware (or other protected workload operations).

The example offload process protector 134 reports attempted access of the isolated memory 136 to, for example, the graphics driver 116 and/or the example application driver 122. In the illustrated example of FIG. 5, the example graphics driver 116 and/or the example application driver 122 receiving the report determines whether the attempted access should be allowed or denied. In some examples, the offload process protector 134 determines whether the attempted access of the isolated memory 136 is associated with an unauthorized application or code and, if so, denies access to the isolated memory 136. That is, in some examples the offload process protector 134 handles the denial of access, and in other examples may cooperate with the example graphics driver 116 and/or the example application driver 122 to deny access to the isolated memory 136.

Thus, the example hypervisor 124 and the example offload process protector 134 protect the offloaded computing task(s) 504 by, for example, monitoring access (or attempted access) of the isolated memory 136. Additionally, by establishing and maintaining the isolated memory 136, the example hypervisor 124 separates the isolated region of memory 136 from other regions of memory 506 corresponding non-offloaded computing task(s) executed by the GPU 106. A non-offloaded computing task refers to normal use of the example GPU 106 via the example graphics driver 116 by application(s) other than the example security application 114, such as programs wishes to render information on a display device. As disclosed herein, the example security application 114 is established as a privileged, trusted user of the GPU 106 (e.g., to offload security related computing task(s) otherwise intended for the CPU 108) via, for example, mutual authentication between the graphics driver 116 and the application driver 122. However, the example graphics driver 116 of FIG. 1 remains responsible for facilitating usage of the GPU 106 by the other applications, an example of which is represented by the non-security application 118 in FIG. 5. The non-security application 118 of FIG. 5 is, for example, a display application. In the illustrated example of FIG. 5, the non-security application 118 utilizes the GPU 106 for image rendering tasks rather than for offloading computing tasks to the GPU 106 that are otherwise intended for execution on the CPU 108. The non-security application 118 of FIG. 5 is for illustrative purposes as an example type of application that utilizing the GPU 106 via non-offloaded computing tasks. As the example graphics driver 116 of facilitates usage of the GPU 106 via the secure tunnel 502 for offloading purposes, as well as a non-secure path 508 from the non-security application 118, the example hypervisor 124 isolates the isolated protected memory 136 in which the offloaded computing task(s) 504 are performed from unprotected memory 506 (at least unprotected by the example offload process protector 134, but perhaps protected by other components or software modules) in which the non-offloaded computing tasks are performed.

In the illustrated example, the isolation of the protected region of memory 136 from the unprotected memory 506 is provided by virtualization of one or more segments of memory by the example hypervisor 124 (e.g., via TMSL virtualization techniques). Accordingly, the example hypervisor 124 protects the offloaded computing task(s) 504 from potential malicious code by hiding the monitored, isolated region of memory 136 from, for example, the OS 102 and other software associated with the OS 102. The example hypervisor 124 hides the isolated region of memory 136 by, for example, not exposing the virtual instances of the isolated region of the memory 136 to the OS 102 and/or the other software. Further, in some examples, keys and/or other types of authentication information used to establish the example trusted channel 500 of FIG. 5 are stored in the example protected region of memory 136 maintained by the example hypervisor 124 and monitored by the example offload process protector 134. Accordingly, the keys used by the graphics driver 116 and the application driver 122 to mutually authenticate each other are protected by the example hypervisor 124.

Thus, under the protection of the example trusted channel 500, the example security application 114 has one or more computing tasks securely transferred to the example GPU 106 for execution under the protection of the example hypervisor 124 of FIG. 1. As disclosed above, the example security application 114 of FIG. 1 includes one or more malware detection tasks well-suited for execution by the example GPU 106. For example, the graphics rendering hardware of the GPU 106, which involve scanning and transferring large amount of data among buffers and memory, is equipped to handle scanning operations that search the computing platform 100 for patterns indicative of malware, such as Advanced Persistent Threats (APTs). Further, security measures provided by the example security application 114 that are designed to provide continuous security to the computing platform 100 would otherwise (if not offloaded to the GPU 106) consume a significant number of CPU cycles. Therefore, the protected offloading of the example computing task(s) 504 of FIG. 5 disclosed herein provides an ability to continuously scan the computing platform 100 for malware without consuming significant numbers of CPU cycles (if any at all). In such instances, the offloaded computing task(s) 1504 report back to the example security application 114 via the secure tunnel 502. In the illustrated example of FIG. 5, the reported data may be conveyed to the server 126 by the example security application 114 and/or to one or more components of the example computing platform 100.

Additionally, the example of FIG. 5 includes a secure container 510 that may provide additional or alternative protection to, for example, the security application 114. For example, the secure container 510 of FIG. 5 is implemented using Software Guard Extensions that provide a secure "enclave." In such instances, a secure channel 512 is established between the example secure container 510 and a graphics microcontroller 514 of the GPU 106. In the illustrated example of FIG. 5, the secure channel 512 is established via key exchange and/or a mutual authentication between the secure container 510 and the microcontroller 514. In some examples, the secure channel 512 is further monitored by the example offload process protector 134.

Figure 6:
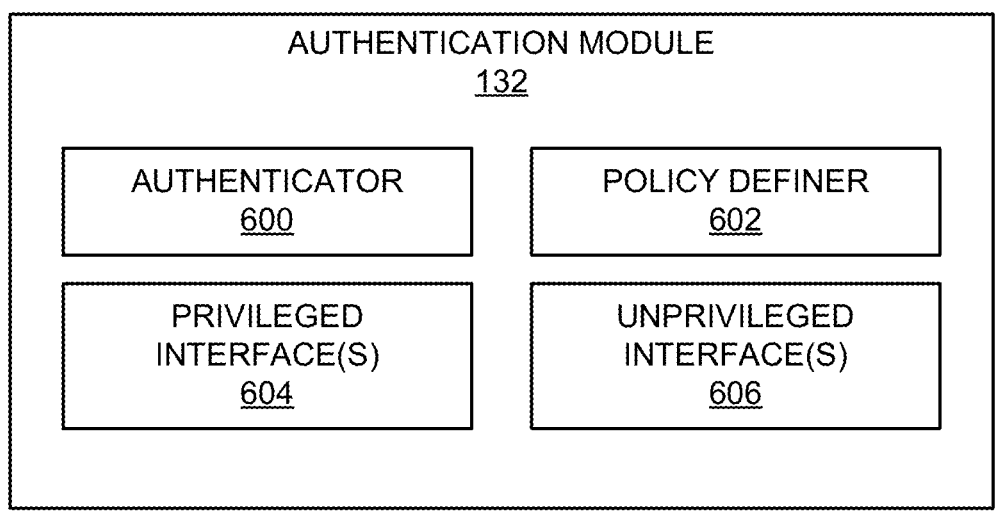
FIG. 6 is a block diagram of an example implementation of the example authentication module of FIG. 1.

FIG. 6 is a block diagram of an example implementation of the example authentication module 132 of the example graphics driver 116 of FIG. 1. To establish the example trusted channel 500 of FIG. 5, the example authentication module 132 of FIG. 6 includes an authenticator 600. The example authenticator 600 of FIG. 6 implements any suitable authentication technique involving, for example, public and/or private keys made available to the example graphics driver 116. In the illustrated example of FIG. 6, the key(s) utilized by the example authenticator 600 are stored in the example isolated memory 136 which, as described above, is protected (e.g., monitored for access) by the example offload process protector 134. As part of the mutual authentication behind establishment of the example trusted channel 500, the example authenticator 600 of FIG. 6 requests the appropriate keys from, for example, the application driver 122 and/or any other driver wanting to offload one or more computing tasks to the example GPU 106. Additionally, because the example trusted channel 500 of FIG. 1 is based on a mutual authentication, the example authenticator 600 of FIG. 6 responds to demands of other drivers for the appropriate key(s). As data is exchanged between, for example, the application driver 122 and the example graphics driver 116, the example authenticator 600 of FIG. 6 checks the data to determine whether the data is, for example, signed with the appropriate key(s). If the example authenticator 600 of FIG. 6 determines that data cannot be authenticated (e.g., presents the wrong key(s)), the example graphics driver 116 refuses to communicate with the corresponding application or program. In the illustrated example of FIG. 6, the keys used by the example authenticator 600 are stored in the isolated region of memory 136 and, thus, are monitored by the example hypervisor 124.

The example authentication module 132 of FIG. 6 includes a policy definer 602 to establish one or more rules or definitions that govern the protection provided by the example offload process protector 134 of FIG. 1. In the illustrated example of FIG. 6, the policy definer 602 defines which portion(s) of memory (e.g., address(es)) are to be monitored by the example offload process protector 134. For example, the policy definer 602 of FIG. 6 designates a particular plurality (e.g., a block or group of sequential addresses and/or virtual addresses) of memory addresses as the example isolated memory 136. In the illustrated example of FIG. 6, the policy definer 602 defines which interface(s) exposed by the GPU 106 are to be monitored by the example offload process protector 134.

For example, the policy definer 602 of FIG. 6 designates certain interface(s) facilitated by the example graphics driver 116 of FIG. 2 between the OS 102 and the GPU 106 as privileged interface(s) 604. As such, the example privileged interface(s) 604 of FIG. 6 are interfaces corresponding to the example offloaded computing task(s) 504 of FIG. 5. In the illustrated example of FIG. 6, the privileged interface(s) 604 are monitored by the example offload process protector 134 which, as a hypervisor, is able to monitor all communications over the privileged interface(s) 604. If the offload process protector 134 determines that one or more of the privileged interface(s) 604 are being used by a malicious (e.g., unrecognized and/or uninvited) application or program the example offload process protector 134 issues an alert, as described in detail below in connection with FIG. 8. That is, the example policy definer 602 of FIG. 6 defines how the offload process protector 134 is to respond to one or more detections of, for example, a potential attack on the offloaded computing task(s) 504). Additionally, in the illustrated example of FIG. 6, the policy definer 602 is responsible for injecting the example hypervisor 124 between the example OS 102 and the example GPU 106. For example, the policy definer 602 of FIG. 6 generates an instance of the example hypervisor 124 (and the corresponding example offload process protector 134 of FIG. 1) at runtime such that, for example, the monitoring functionality of the offload process protector 134 executes during operation of the application driver 122 and/or the graphics driver 116.

While the example policy definer 602 is described above as implemented by the example graphics driver 116, additional or alternative components, such as the example application driver 122 and/or the example hypervisor 124 may implement the example policy definer 602.

The example authentication module 132 of FIG. 6 includes one or more unprivileged interfaces 606 that correspond to exposures of the GPU 106 to, for example, the non-security application 118 and/or other applications utilizing the GPU 106 for tasks traditionally intended for the GPU 106, such as image rendering tasks. In the illustrated example of FIG. 6, the unprivileged interface(s) 606 correspond to the non-secure path 508 of FIG. 5. In the illustrated example of FIG. 6, the offload process protector 134 does not monitor the example unprivileged interface(s) 606. However, alternative examples of the graphics driver 116 may not include any unprivileged interfaces. That is, the example offload process protector 134 may monitor all interfaces of the example GPU 106.

While an example manner of implementing the authentication module 132 of FIG. 1 is illustrated in FIG. 6, one or more of the elements, processes and/or devices illustrated in FIG. 6 may be combined, divided, re-arranged, omitted, eliminated and/or implemented in any other way. Further, the example authenticator 600, the example policy definer 604, the example privileged interface(s) 604, the example unprivileged interface(s) 606 and/or, more generally, the example authentication module 132 of FIG. 6 may be implemented by hardware, software, firmware and/or any combination of hardware, software and/or firmware. Thus, for example, any of the example authenticator 600, the example policy definer 604, the example privileged interface(s) 604, the example unprivileged interface(s) 606 and/or, more generally, the example authentication module 132 of FIG. 6 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example authenticator 600, the example policy definer 604, the example privileged interface(s) 604, the example unprivileged interface(s) 606 and/or, more generally, the example authentication module 132 of FIG. 6 is/are hereby expressly defined to include a tangible computer readable storage device or storage disk such as a memory, a digital versatile disk (DVD), a compact disk (CD), a Blu-ray disk, etc. storing the software and/or firmware. Further still, the example authentication module 132 of FIG. 1 may include one or more elements, processes and/or devices in addition to, or instead of, those illustrated in FIG. 6, and/or may include more than one of any or all of the illustrated elements, processes and devices.

Figure 7:
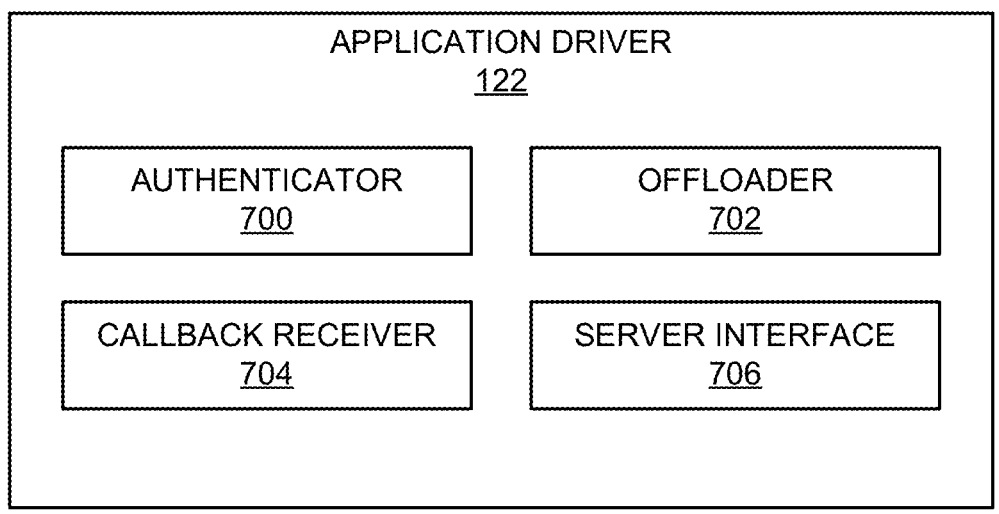
FIG. 7 is block diagram of an example implementation of the example application driver of FIG. 1.

FIG. 7 illustrates an example implementation of the example application driver 122 of FIG. 1. The example application driver 122 of FIG. 7 includes an authenticator 700 that interacts with the example authenticator 600 of the example graphics driver 116 of FIG. 6. The example authenticator 700 of FIG. 7 and the example authenticator 600 of FIG. 6 cooperate to mutually authenticate the example application driver 122 and the example graphics driver 116. Similar to the example authenticator 600 of FIG. 6, the example authenticator 700 of FIG. 7 utilizes any suitable authentication technique to send authentication information and to demand authentication information. In the illustrated example of FIG. 7, the authenticator 700 utilizes one or more public and/or private keys to communicate with the example graphics driver 116. In the illustrated example, the key(s) utilized by the example authenticator 700 of FIG. 7 are stored in the isolated memory 136 and, thus, access to the key(s) is monitored by the example offload process protector 134.

The example application driver 122 of FIG. 7 includes an offloader 702 that conveys the example offloaded computing task(s) 504 of FIG. 5 from the example security application 114 to the example GPU 106 via the example graphics driver 116. In some examples, the example offloader 702 of FIG. 7 cooperates with the example offloader 202 of FIG. 2 of the example security application 114 to facilitate the offloading of security tasks to the GPU 106. In the illustrated example of FIG. 7, the offloader 702 is not able to convey computing tasks to the example graphics driver 116 until the application driver 122 has been mutually authenticated with the example graphics driver 116. When the mutual authentication is established, the example offloader 702 incorporates any necessary authentication information into the computing task(s) to be offloaded before conveying the same to the graphics driver 116. For example, the offloader 702 of FIG. 7 appends a session key to the computing task data before conveying the same to the example graphics driver 116. In some examples, the offloader 702 of FIG. 7 receives instructions from the example security application 114 regarding which computing tasks are to be offloaded. Additionally or alternatively, the example offloader 702 may determine which computing task(s) are to be offloaded based on, for example, a type of computing task well suited for execution on the example GPU 106 of FIG. 1. In some examples, each computing task of the security application 114 is offloaded to the GPU 106 via the example offloader 702.

The example application driver 122 of FIG. 7 includes a callback receiver 704 that receives, for example, alerts raised by the example offload process protector 134 of FIG. 1. As described above, the example offload process protector 134 monitors, for example, the isolated memory 136 in which the example offloaded computing task(s) 504 are executed and generates alerts when, for example, malicious code attempts to access the monitored regions of memory. In the illustrated example of FIG. 7, the callback receiver 704 of the application driver 122 receives the alerts and generates a record of the detected potential attacks. In the illustrated example, the callback receiver 704 timestamps the received alert and records the time against details of the potential attack (e.g., the memory address and/or identifying data associated with the alleged attacker). In some examples, the callback receiver 704 includes a plurality of responses and definitions that govern how the computing platform 100 is to respond to potential attacks. When an alert is received at the example application driver 122, the example callback receiver 704 queries a lookup table with information associated with the alert to identify a response. The example callback receiver 704 of FIG. 7 instructs the example offload process protector 134 of FIG. 1 using the information obtained from the lookup table to, for example, cease the execution of the offloaded computing task(s) 504 and/or to move execution of the offloaded computing task(s) 504 to the example CPU 108. Additionally or alternatively, the example callback receiver 704 of FIG. 7 may inform the example graphics driver 116 of the alert and/or instruct the example graphics driver 116 to check the integrity of its code.

The example application driver 122 of FIG. 7 includes a server interface 706 to communication with, for example, the sever 126 of FIG. 1. The example server interface 706 of FIG. 7 conveys, for example, the attack information recorded by the example callback receiver 704 to the server 126 of FIG. 1 provides update(s) to the example application driver 122 via the example server interface 706.

While an example manner of implementing the application driver 122 of FIG. 1 is illustrated in FIG. 7, one or more of the elements, processes and/or devices illustrated in FIG. 7 may be combined, divided, re-arranged, omitted, eliminated and/or implemented in any other way. Further, the example authenticator 700, the example offloader 702, the example callback receiver 704, the example server interface 706, and/or, more generally, the example application driver 122 of FIG. 7 may be implemented by hardware, software, firmware and/or any combination of hardware, software and/or firmware. Thus, for example, any of the example authenticator 700, the example offloader 702, the example callback receiver 704, the example server interface 706, and/or, more generally, the example application driver 122 of FIG. 7 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example authenticator 700, the example offloader 702, the example callback receiver 704, the example server interface 706, and/or, more generally, the example application driver 122 of FIG. 7 is/are hereby expressly defined to include a tangible computer readable storage device or storage disk such as a memory, a digital versatile disk (DVD), a compact disk (CD), a Blu-ray disk, etc. storing the software and/or firmware. Further still, the example application driver 122 of FIG. 1 may include one or more elements, processes and/or devices in addition to, or instead of, those illustrated in FIG. 7, and/or may include more than one of any or all of the illustrated elements, processes and devices.

Figure 8:
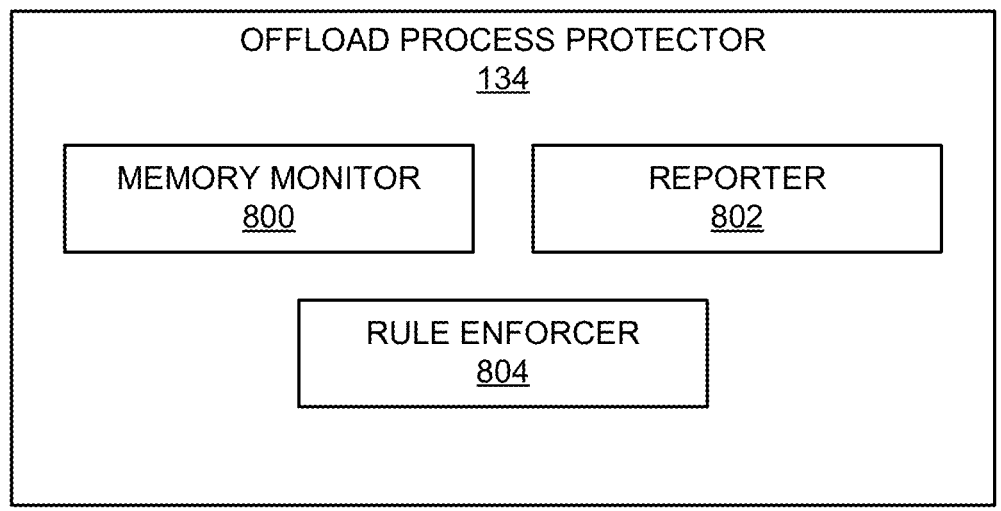
FIG. 8 is block diagram of an example implementation of the example offload process protector of FIG. 1.

FIG. 8 illustrates an example implementation of the example offload process protector 134 of FIG. 1. The example offload process protector 134 of FIG. 8 is implemented by or as a hypervisor having a highest privilege possible on the example computing platform 100 of FIG. 1. For example, when the computing platform 100 employs an Intel® architecture, the example offload process protector 134 of FIG. 8 has the ring-minus-one (ring-1) privilege level and, thus, is able to monitor, for example, hardware and/or software of the computing platform 100 of any privilege level. As described above, the example offload process protector 134 of FIG. 8 receives configuration information from, for example, the application driver 122 of FIG. 1. Additional or alternative sources of configuration information are possible such as, for example, the authentication module 132 of FIGS. 1 and/or 6.

In the illustrated example, the offload process protector 134 of FIG. 8 includes a memory monitor 800 that interprets the configuration information to know which region(s) of memory to monitor. In the example of FIG. 8, the memory monitor 800 determines an address range associated with (e.g., defining) the example isolated region of memory 136. The example memory monitor 800 of FIG. 8 identifies instances of the isolated region of memory 136 being accessed and gathers data (e.g., an identifier) regarding the attempted access. In the illustrated example of FIG. 8, the memory monitor 800 determines whether an unauthorized access has occurred based on, for example, a plurality of authorized users provided by, for example, the application driver 122 and/or the example graphics driver 116.

The example offload process protector 134 of FIG. 8 includes a reporter 802 to convey a notification regarding unauthorized attempted access(es) of the isolated region of memory 136 to, for example, the application driver 122 and/or the example graphics driver 116. As described above, the application driver 122 and/or the example graphics driver 116 instruct the example offload process protector 134 of FIG. 8 regarding a response to an unauthorized access in response to the notification sent by the example reporter 802.

The example offload process protector 126 of FIG. 8 includes a rule enforcer 804 to implement the response selected by the example application driver 122 and/or the example graphics driver 116. For example, the rule enforcer 804 of FIG. 8 denies access to the unauthorized request and/or ceases execution of the offloaded computing task(s) 504 in the example GPU 106.

While an example manner of implementing the offload process protector 134 of FIG. 1 is illustrated in FIG. 8, one or more of the elements, processes and/or devices illustrated in FIG. 8 may be combined, divided, re-arranged, omitted, eliminated and/or implemented in any other way. Further, the example memory monitor 800, the example reporter 802, the example rule enforcer 804, and/or, more generally, the example offload process protector 134 of FIG. 8 may be implemented by hardware, software, firmware and/or any combination of hardware, software and/or firmware. Thus, for example, any of the example memory monitor 800, the example reporter 802, the example rule enforcer 804, and/or, more generally, the example offload process protector 134 of FIG. 8 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example memory monitor 800, the example reporter 802, the example rule enforcer 804, and/or, more generally, the example offload process protector 134 of FIG. 8 is/are hereby expressly defined to include a tangible computer readable storage device or storage disk such as a memory, a digital versatile disk (DVD), a compact disk (CD), a Blu-ray disk, etc. storing the software and/or firmware. Further still, the example offload process protector 134 of FIG. 1 may include one or more elements, processes and/or devices in addition to, or instead of, those illustrated in FIG. 8, and/or may include more than one of any or all of the illustrated elements, processes and devices.

Figure 9:
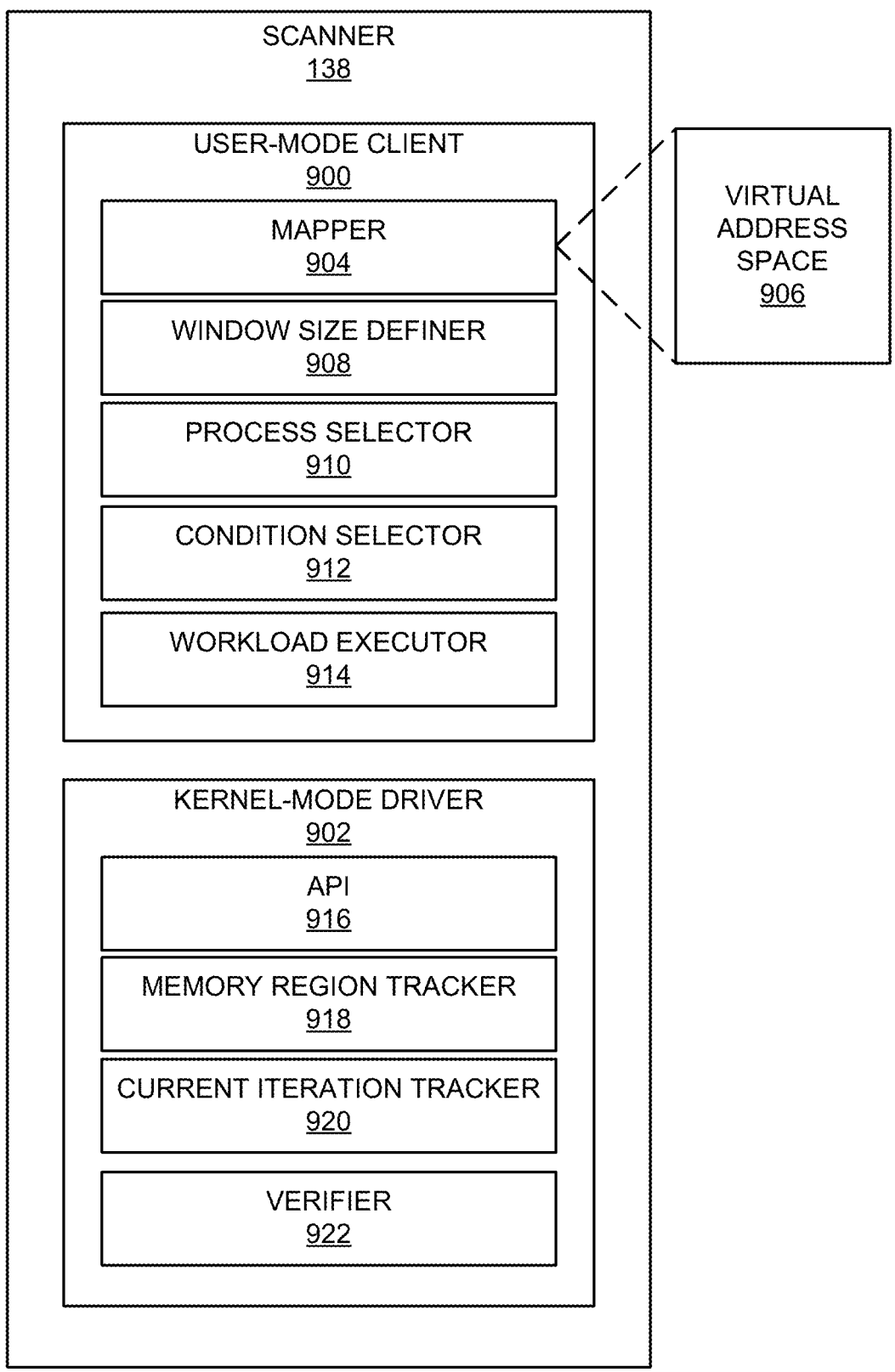
FIG. 9 is block diagram of an example implementation of the example scanner of FIG. 1.

FIG. 9 is a block diagram of an example implementation of the example scanner 138 of FIG. 1. The example scanner 138 of FIGS. 1 and/or 9 can be utilized (e.g., called) by, for example, the security application 114 to scan one or more regions of memory. In some examples, the scanner 138 is implemented outside of the example security application 114 and is accessible to any other suitable application associated with the computing platform 100. In some examples, the GPU 106 executes operations of the scanner 138 (e.g., as offloaded by the example offloader 202 of FIG. 2).

Figure 10:
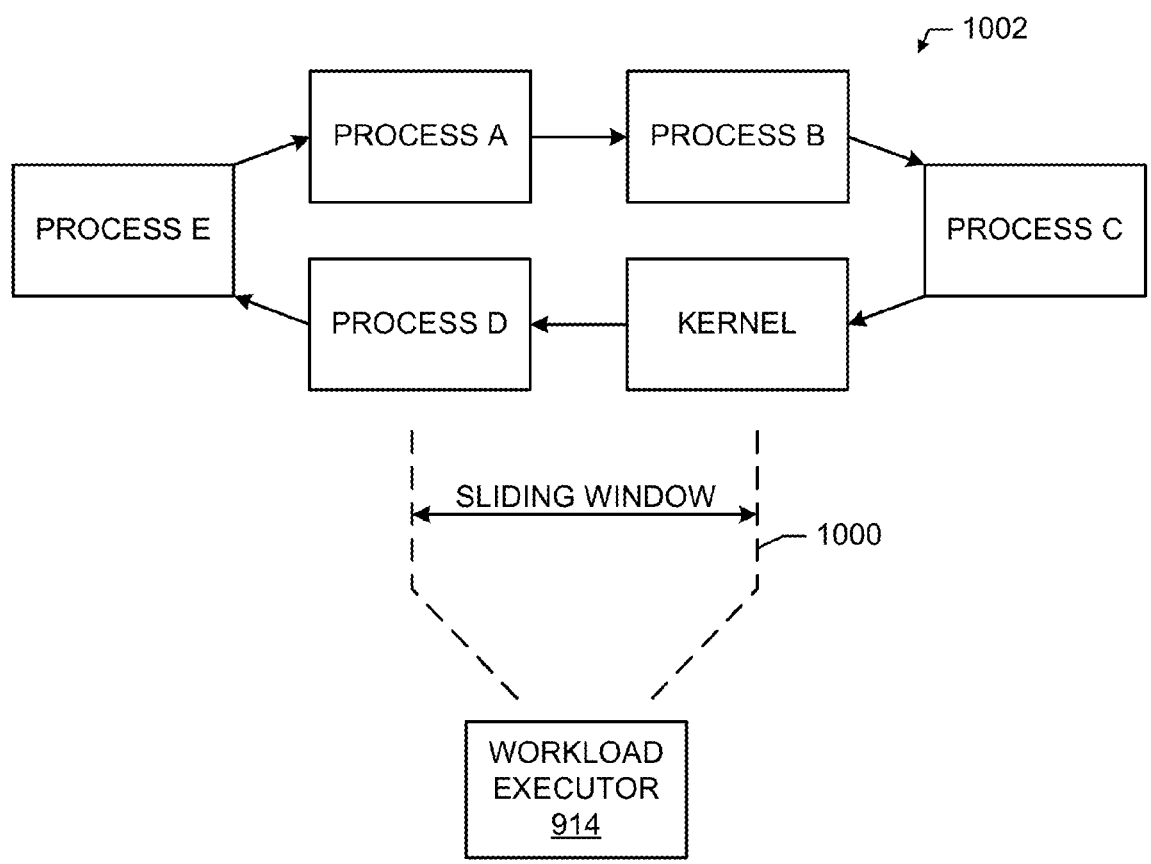
FIG. 10 is a diagram illustrating example operations of the example scanner of FIGS. 1 and/or 9.

The example scanner 138 of FIG. 9 includes a user-mode client 900 and a kernel-mode driver 902. The example user-mode client 900 and the example kernel-mode driver 902 of FIG. 9 cooperate to implement a sliding window that is used to process (e.g., scan) regions of memory associated with different processes in parallel. In the example of FIG. 9, as the sliding window proceeds through the memory to be processed, a mapper 904 of the user-mode client 900 maps the region(s) of memory inside the sliding window to a virtual address space 906 associated with, for example, the user-mode client 900. An example of the sliding window 1000 and a progression 1002 through the memory corresponding to the different processes is illustrated in FIG. 10. As the respective memory corresponding to the different processes (e.g., PROCESSES A-E and a kernel process in FIG. 10) proceed through the sliding window 100, the mapper 904 maps the memory within the sliding window 1000 to the virtual address space 906. Notably, more than one of the processes of FIG. 10 (e.g., PROCESS D and the kernel process) can simultaneously be within the sliding window 1000. As such, memory corresponding to more than one of the processes of FIG. 10 can be simultaneously mapped to the virtual address space 906. In the illustrated example, an amount of overlap in the sliding window 1000 across multiple ones of the processes of FIG. 10 depends on a size of the sliding window 1000. The example user-mode client 900 of FIG. 9 includes a window size definer 908 to define the size of the sliding window. In some examples, the window size definer 908 provides options to a user and includes a default size for the sliding window.

The example user-mode client 900 of FIG. 9 includes a process selector 910 to enable selection of the one or more process to be processed (e.g., scanned) by the scanner 138. The example process selector 910 of FIG. 9 designates which process(es) to monitor by, for example, providing a program identifier (PID) and/or a name (e.g., a wildcarded name). For example, the process selector 910 of FIG. 9 may provide a PID associated with PROCESS A of FIG. 10 if the process selector 910 selects PROCESS A to be scanned for, for example, the malware-indicative patterns 200 of FIG. 2. Additionally or alternatively, the process selector 910 of FIG. 9 may provide a PID and/or name associated with a kernel if the process selector 910 selects the kernel process of FIG. 10. In some examples, the designation of which process to be scanned is provided by the scan target selector 210 of FIG. 2 and/or the real-time receiver 404 of FIG. 4.

The example user-mode client 900 of FIG. 9 includes a condition selector 912 to enable selection of one or more conditions that further define which portions and/or aspects of the selected processes are to be monitored. For example, the condition selector 912 of FIG. 9 enables selection of an address range or module name for a particular selected process that corresponds to a particular aspect of the selected process. As such, the example process selector 910 and the example condition selector 912 of FIG. 9 enable the user-mode client 900 to monitor specific portions of specific processes.

The example user-mode client 900 of FIG. 9 includes a workload executor 914 to execute a workload associated with the user-mode client 900. In the illustrated example of FIG. 9, the workloads to be executed by the workload executor 914 include scans of memory mapped in the virtual address space 906. The scans executed by the example workload executor 914 of FIG. 9 search the memory for patterns such as, for example, the malware-indicative patterns 200 of FIG. 2. In the illustrated example of FIG. 9, the operations associated with the workload executor 914 are executed by the hardware of the GPU 106 (e.g. via an OpenCL kernel running on the GPU 106).

The example kernel-mode driver 902 of FIG. 9 exposes an application programming interface (API) 916 to the example user-mode client 900. In some examples, the kernel-mode driver 902 requires the user-mode client 900 to be authenticated before exposing the API 916 to the user-mode client 900. The example API 916 of FIG. 9 provides an interface for the user-mode client 900 to configure the example sliding window 1000 and the characteristics of the sliding window 1000. For example, the API 916 of FIG. 9 enables the window size definer 908 to convey data to the kernel-mode driver 902 indicative of the defined window size (e.g., as a number of bytes). In response, the example kernel-mode driver 902 sets and maintains the size of the sliding window 100. Additionally, the example kernel-mode driver 902 returns a pointer to the user-mode client 900 indicative of a location in the virtual address space 906 at which the sliding window 1000 resides. In the illustrated example, the workload executor 914 of the example user-mode client 900 utilizes the pointer to execute the workload on data of the appropriate location in the virtual address space 906. Further, the example API 916 of FIG. 9 enables the process selector 910 and the condition selector 912 to convey data to the kernel-mode driver 902 indicative of the selected process(es) and/or aspect(s) of the selected process(es) to be monitored (e.g., the PROCESSES A-E and the kernel process of FIG. 10). In response, the example kernel-mode driver 902 utilizes a memory region tracker 918 to track the regions of memory to be monitored. For example, the memory region tracker 918 of FIG. 9 maintains a list of the processes to be monitored and/or the conditions associated with the respective processes that define which portions of memory are to be monitored. In the illustrated example of FIG. 9, the memory region tracker 918 keeps the list of processes up-to-date by, for example, monitoring process creation and/or process destruction and adding and removing processes as required.

The example kernel-mode driver 902 of FIG. 9 includes a current iteration tracker 920 to track a current position in the process and/or kernel currently being monitored. As the sliding window 1000 progresses through the processes being monitored, the example current iteration tracker 920 updates a value representative of the current location in, for example, the example progression 1002 of FIG. 10. In the illustrated example, starting at the current position in the progression 1002, the sliding window 1000 iterates through, for example, the paging structures of the processes being monitored, searching for pages which are both present (e.g., not paged out) and, if any condition(s) are specified (e.g., by the condition selector 912) for the current process, match the selected condition(s). Matching pages are mapped into the sliding window 1000 by, for example direct page table manipulation (e.g., without copying). Alternatively, the data can be copied into the sliding window 1000. This progression proceeds until either the sliding window 1000 is full or the entire set of monitored ranges has been traversed. In some examples, a total number of bytes mapped, which may be less than the window size, is returned to the user-mode client 900.

As described above, the workload executor 914 of FIG. 9 performs the workload of the user-mode client 900 which, in the illustrated example, is a scan of the memory mapped to the virtual address space 906 via the sliding window 1000 for the malware-indicative patterns 200 of FIG. 2. Notably, the scan enabled by the example user-mode client 900 and the example kernel-mode driver 902 includes parallel scanning of multiple different processes spanning across multiple regions of memory. If the scanning performed by the example workload executor 914 of FIG. 9 (e.g., on the hardware of the GPU 106) results in one or more matches, the example workload executor 914 returns, for example, the corresponding one or more offsets into the virtual address space 906. The offsets correspond to a particular region or location in memory associated with, for example, malware-indicative code. As described above, one or more applications such as the security application 114 are provided with identifying information associated with memory location and/or process identification that were found to be indicative of malware. In some examples, the kernel-mode driver 902 utilizes a verifier 922 to verify the match at the original memory location corresponding to the offset. The verification provided by the example verifier 922 is useful when, for example, a potential race condition caused by physical pages mapped via the sliding window being reassigned before the scan completes. To verify the detected match, the example verifier 922 performs a similar or alternative pattern-matching scan as the workload executor 914 to determine if the initially detected match is accurate.

Accordingly, the example scanner 138 of FIG. 9 provides the example computing platform 100 scanning techniques that increase throughput and, thus, enable the computing platform 100 (e.g., via the example security application 114) to be more aggressive in scheduling and/or configuration of memory scans for, for example, malware.

While an example manner of implementing the scanner 138 of FIG. 1 is illustrated in FIG. 9, one or more of the elements, processes and/or devices illustrated in FIG. 9 may be combined, divided, re-arranged, omitted, eliminated and/or implemented in any other way. Further, the example user-mode client 900, the example kernel-mode driver 902, the example mapper 904, the example window size definer 908, the example process selector 910, the example condition selector 912, the example workload executor 914, the example API 916, the example memory region tracker 918, the example current iteration tracker 920, the example verifier 922 and/or, more generally, the example scanner 138 of FIG. 9 may be implemented by hardware, software, firmware and/or any combination of hardware, software and/or firmware. Thus, for example, any of the example user-mode client 900, the example kernel-mode driver 902, the example mapper 904, the example window size definer 908, the example process selector 910, the example condition selector 912, the example workload executor 914, the example API 916, the example memory region tracker 918, the example current iteration tracker 920, the example verifier 922 and/or, more generally, the example scanner 138 of FIG. 9 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example user-mode client 900, the example kernel-mode driver 902, the example mapper 904, the example window size definer 908, the example process selector 910, the example condition selector 912, the example workload executor 914, the example API 916, the example memory region tracker 918, the example current iteration tracker 920, the example verifier 922 and/or, more generally, the example scanner 138 of FIG. 9 is/are hereby expressly defined to include a tangible computer readable storage device or storage disk such as a memory, a digital versatile disk (DVD), a compact disk (CD), a Blu-ray disk, etc. storing the software and/or firmware. Further still, the example offload process protector 134 of FIG. 1 may include one or more elements, processes and/or devices in addition to, or instead of, those illustrated in FIG. 8, and/or may include more than one of any or all of the illustrated elements, processes and devices.

Figure 11:
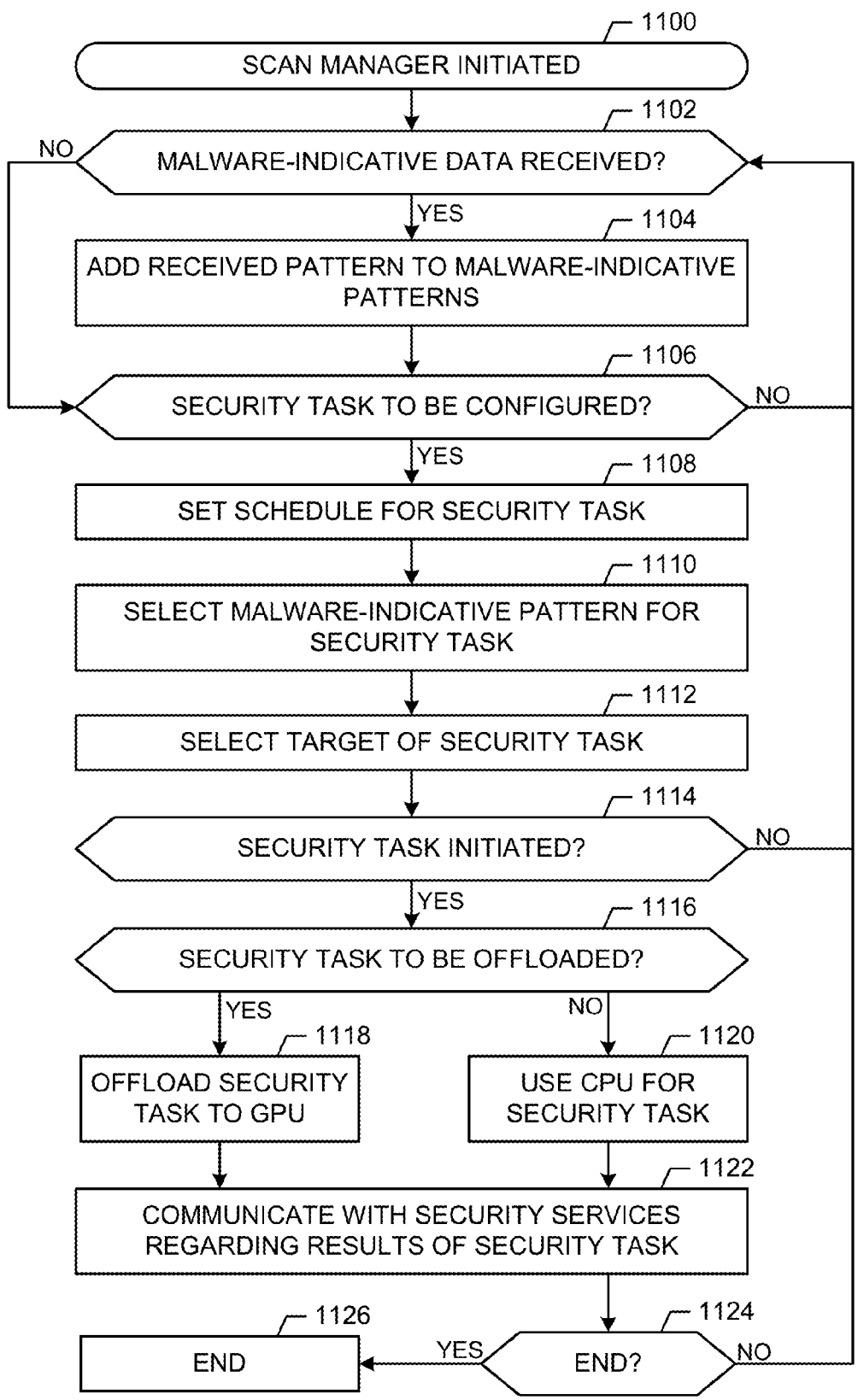
FIG. 11 is a flowchart representative of example machine readable instructions that may be executed to implement the example scan manager of FIGS. 1 and/or 2.

FIG. 11 is a flowchart representative of example machine readable instructions for implementing the example security application 114 of FIGS. 1 and/or 2. The example of FIG. 11 begins with an initiation of the example security application 114 (block 1100). The initiation of the example security application 114 corresponds to, for example, the OS 102 becoming active and/or being loaded. In some examples, the security application 114 can be activated and deactivated by a user. As described above, the example security application 114 utilizes the malware-indicative patterns 200 to scan, for example, one or more regions of the memory 112 of the example computing platform 100. The malware-indicative patterns 200 are updated when the security application 114 receives information regarding, for example, newly discovered malware-indicative information. In the example of FIG. 11, if such malware-indicative data (e.g., pattern(s)) are received by the security application 114 (block 1102), the received data is added to the malware-indicative patterns 200 (block 1104).

In the example of FIG. 11, the example scan initiator 204 determines whether a security task (e.g., a scan of one or more regions of the memory 112) is to be configured (block 1106). For example, the scan initiator 204 may receive newly discovered malware-indicative information (e.g., via the real time receiver 404 of the example network interface driver 120 of FIG. 4) and instructions to configure a scan of the computing platform 100 for the malware-indicative information. If so, the example scan initiator 204 sets a schedule for the security task (block 1108). In some examples, the scan initiator 204 sets the security task to be continuously run (e.g., until otherwise notified). In some examples, the scan initiator 204 sets the security task to be periodically and/or randomly run. Further, the example scan pattern selector 208 selects one or more of the malware-indicative patterns 200 as a basis for the security task (block 1110). In some examples, the selected pattern(s) correspond to the newly discovered malware-indicative information (e.g., received via the real time receiver 404 of the example network interface driver 120). Further, the example scan target selector 210 selects one or more targets of the security task (block 1112). In some examples, the scan target selector 210 selects the target(s) based on information received in connection with the newly discovered malware-indicative information. For example, the real time receiver 404 may receive instructions regarding a type of memory to scan in connection with the corresponding malware-indicative information.

With the security task being configured, the example scan initiator 204 determines whether the security task has been initiated (block 1114). The initiation of the security task corresponds to, for example, the schedule set for the security task and/or the trigger event analyzer 206 triggering the security task in response to a detected event. When the security task is to be initiated, the example offloader 202 determines whether the security task is to be offloaded to the example GPU 106 of the computing platform (block 1116). In some examples, the default of the offloader 202 is to offload the security task to the GPU 106. In some example, the security task includes a designation or instruction to be read by the offloader 204 that indicates whether the GPU 106 or the CPU 108 is to execute the security task. For example, more aggressively configured security tasks may be designated for execution on the GPU 106. If the security task is to be offloaded, the example offloader 202 cooperates with the example graphics driver 116 (and the application driver 122) to offload the security task to the GPU 106 (block 1118). Otherwise, the security task is executed by the CPU 108 (block 1120).

The appropriate one of the GPU 106 or the CPU 108 executes the security task and the example security application 114 receives the results. In the illustrated example of FIG. 11, the example security services communicator 212 conveys findings to any suitable component(s) such as, for example, a malware remover of the example computing platform 100 (block 1122). Additionally or alternatively, the example security services communicator 212 provides the finds to the example network interface driver 120, which facilitates real time reporting of the findings via the example real time reporter 402 (block 1122). If the security application 114 is to be terminated (block 1124), the example of FIG. 11 ends (block 1126). Otherwise, control returns to block 1102.

Figure 12:
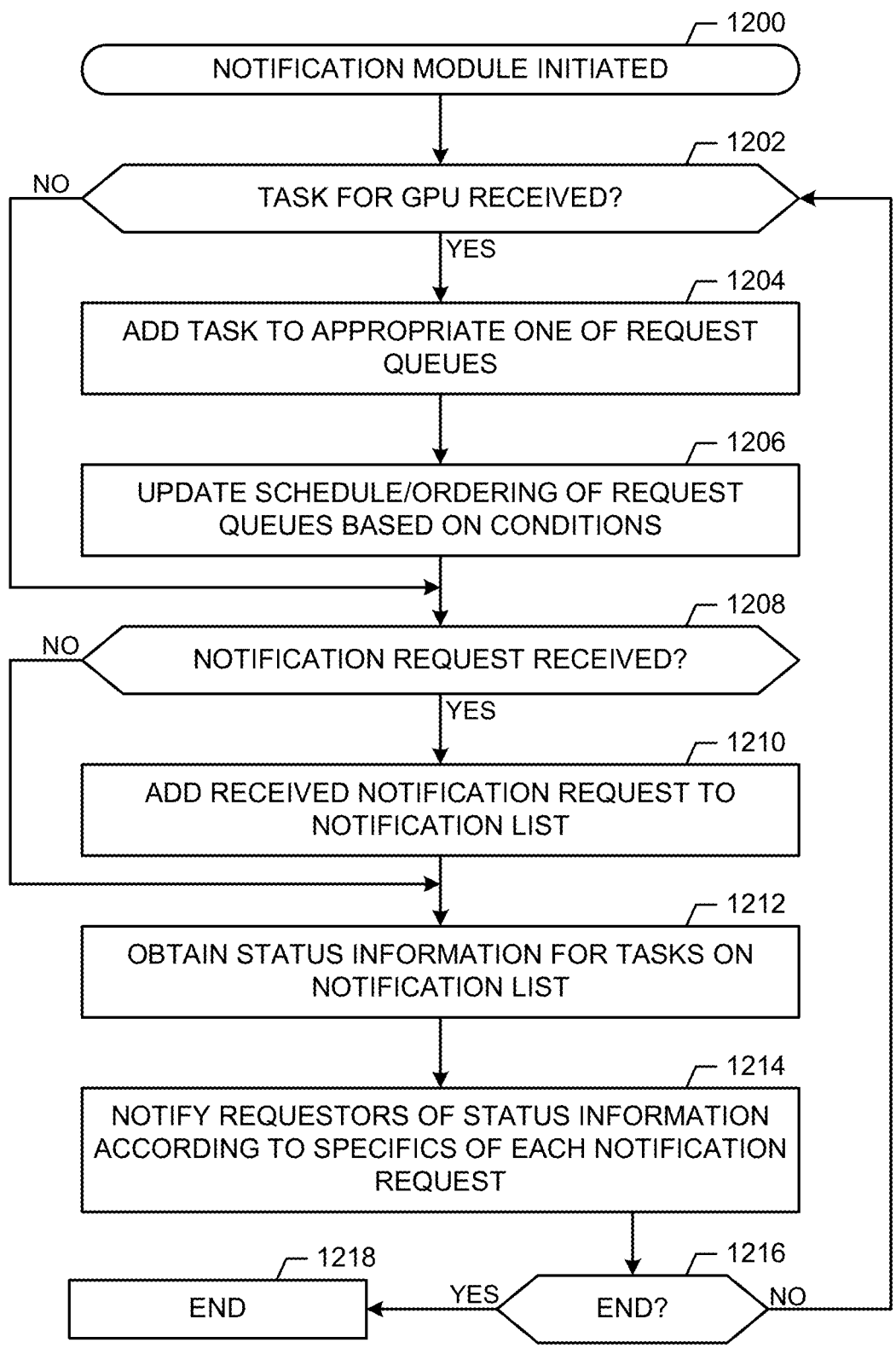
FIG. 12 is a flowchart representative of example machine readable instructions that may be executed to implement the example notification module of FIGS. 1 and/or 3.

FIG. 12 is a flowchart representative of example machine readable instructions for implementing the example notification module 130 of FIGS. 1 and/or 3. The example of FIG. 12 begins with an initiation of the example graphics driver 116 and, thus, the example notification module 130 (block 1200). The initiation of the example graphics driver 116 corresponds to, for example, the OS 102 becoming active and/or being loaded. In some examples, the graphics driver 116 can be activated and deactivated in response to activation of a display device. As described above, the example graphics driver 116 facilitates interactions between components of the computing platform 100 (e.g., the security application 114 and/or the non-security application 118) and the GPU 106. If a task (e.g., a security task associated with the security application 114) to be executed by the GPU 106 is received at the graphics driver 116 (block 602), the example dispatcher 300 of the notification module 130 identifies an appropriate one of the request queues 302 (e.g., based on a type of the received task) for the task and adds the received task to the identified one of the request queues 302 (block 1204).

In the example of FIG. 12, the scheduler 304 determines an order for the respective request queues 302 based on one or more conditions of the computing platform 100 and/or the request queues 302 (block 1206). For example, the scheduler 304 determines the order of the queued tasks based on queue depths, priority levels assigned to the individual tasks, a time slice to use for preemption, and/or any other suitable factor or condition. As described above, the GPU 106 executes the tasks of the request queues 302 in the determined order.

In the example of FIG. 12, the notifier 306 receives notification requests from, for example, the security application 114 when the security application 114 has offloaded a corresponding security task to the GPU 106. If such a request is received (block 1208), the example notifier 306 adds the received request and the specifics of the request (e.g., which status details are desired and/or which status changes are to trigger a notification) to the list of notification requests maintained by the notifier 306 (block 1210). The example scheduler 304 determines a status of the tasks in the request queues 302 and/or tasks currently being executed (e.g., in parallel) in the GPU 106 (block 1212) and provides the obtained information to the notifier 306. The example notifier 306 analyzes the received status information and determines whether any of the notification requests indicate that a notification is to be conveyed to a requesting consumer of the GPU 106 (block 1214). If so, the example notifier 306 sends the corresponding notification and the accompanying details (block 1214). If the notification module 130 is to be terminated (block 1216), the example of FIG. 12 ends (block 1218). Otherwise, control returns to block 1202.

Figure 13:
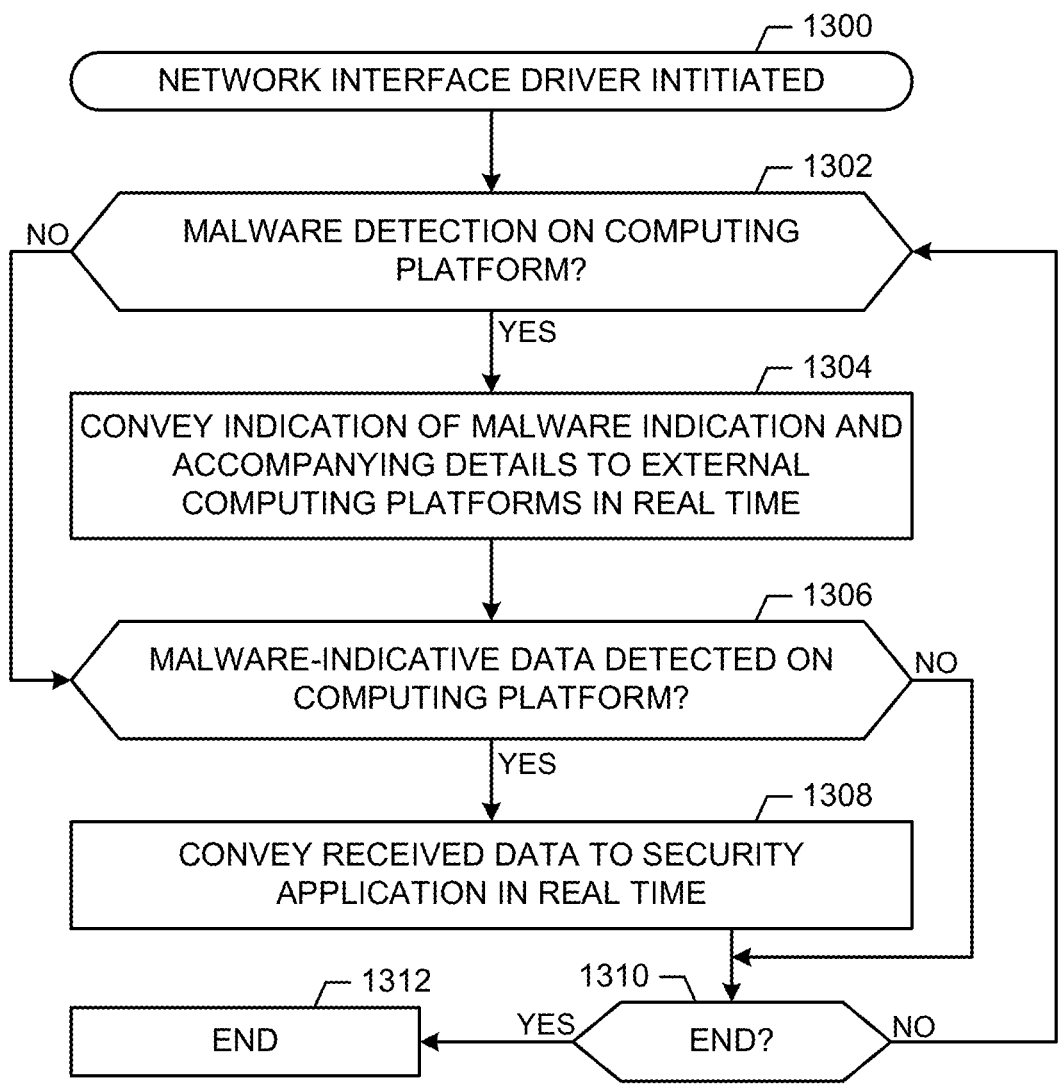
FIG. 13 is a flowchart representative of example machine readable instructions that may be executed to implement the example network interface driver of FIGS. 1 and/or 4.

FIG. 13 is a flowchart representative of example machine readable instructions for implementing the network interface driver 120 of FIGS. 1 and/or 4. The example of FIG. 13 begins with initiation of the example network interface driver 120 (block 1300). The initiation of the example network interface driver 120 corresponds to, for example, the OS 102 becoming active and/or being loaded. In some examples, the network interface driver 120 can be activated and deactivated in response to activation of the network interface 110. As described above, the example network interface driver 120 facilitates interactions between components of the computing platform 100 and the network interface 110. In addition to driving operation of the network interface 110, the example network interface driver 120 enables sharing of malware-indicative data with, for example, the external computing platforms 400 of FIG. 4.

In the example of FIG. 13, if malware-indicative data is received at the real time receiver 404 (block 1302), the example real time receiver 404 immediately (e.g., without delay) conveys the received data to, for example, the security application 114 (block 1304). In the illustrated example, the security application 114 uses to received data to, for example, immediately (e.g., without delay) initiate or trigger a scan of memory associated with the received data. As described above, such a real time provision of malware-indicative data improves an ability of the security application 114 to detect malware while the malware is active (e.g., unobfuscated, unpacked, decrypted, etc.), thereby avoiding the difficulty of trying to detect malware that is inactive (e.g., obfuscated, packed, encrypted, etc.).

In the example of FIG. 13, if a component of the computing platform 100, such as the security application 114, detects malware-indicative information (block 1306), the example real time reporter 402 immediately (e.g., without delay) conveys the detected information and any suitable accompanying information (e.g., extracted contextual metadata associated with the malware detection) to, for example, the external computing platforms 400 via the network interface 110 (block 1308). As described above, such a real time provision of malware-indicative data improves an ability of the external computing platforms 400 to detect malware while the malware is active, thereby avoiding the difficulty of trying to detect malware that is inactive. If the network interface driver 120 is to be terminated (block 1310), the example of FIG. 13 ends (block 1312). Otherwise, control returns to block 1302.

Figure 14:
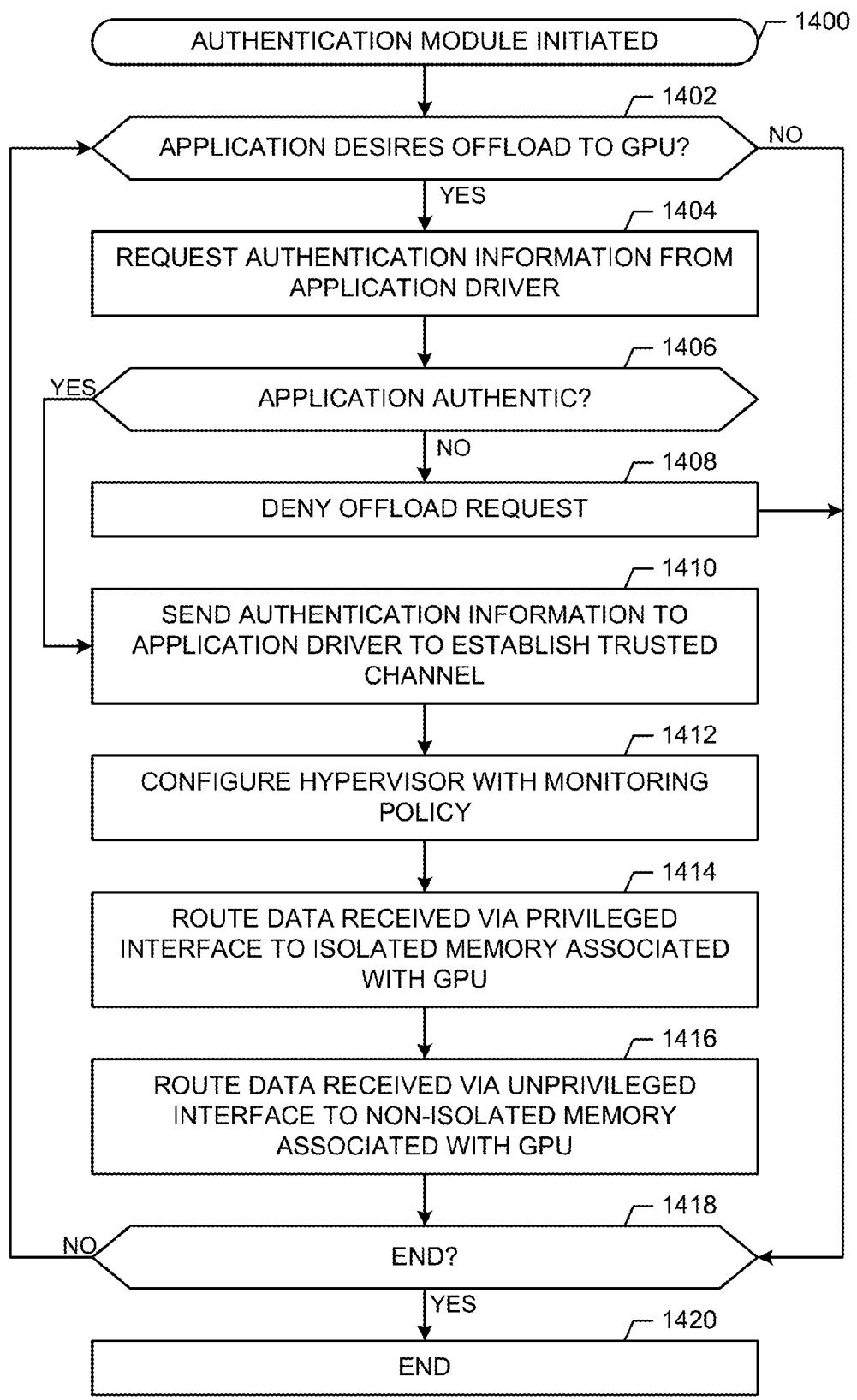
FIG. 14 is a flowchart representative of example machine readable instructions that may be executed to implement the example authentication module of FIGS. 1 and/or 6.

FIG. 14 is a flowchart representative of example machine readable instructions for implementing the example authentication module 132 of FIGS. 1 and/or 6. The example of FIG. 14 begins with initiation of the example authentication module 132 (block 1400). The initiation of the example authentication module 132 corresponds to, for example, the OS 102 becoming active and/or being loaded. In the example of FIG. 14, the authentication module 132 may receive an indication that the security application 114 desires to offload a computing task to the GPU 106 (block 1402). For example, the security application 114 may determine that a metric measuring CPU cycles can be improved by executing the one or more computing tasks in the GPU 106 rather than the CPU 108. In the example of FIG. 14, the authentication module 132 receives the indication from the application driver 122 and requests authentication information from the application driver 122 (block 1404). The example authentication module 132 requests the authentication information from the application driver 122 so that the example trusted channel 500 of FIG. 5 can be established. In the illustrated example of FIG. 14, the requested authentication information includes, for example, one or more public keys and/or private keys. The example authenticator 600 of the example authentication module 132 of FIG. 6 determines whether received authentication information received from the application driver 122 are authentic (block 1406). For example, the authenticator 600 of FIG. 6 determines whether a response from the application driver 122 includes a recognized authentication key.

In the example of FIG. 14, when the application driver 122 provides unrecognized authentication information (block 1406), the example authenticator 600 of FIG. 6 informs the example graphics driver 116 that the application driver 122 and/or the security application 114 cannot be trusted and denies the offload request (block 1408). Alternatively, when the application driver 122 provides recognized authentication information, thereby indicating that the security application 114 is authentic, the example authenticator 600 of FIG. 6 conveys authentication information to the application driver 122 such that the application driver 122 can authenticate the example graphics driver 116 (block 1410). That is, the example trusted channel 500 of FIG. 5 is established through a mutual authentication between the example application driver 122 and the example graphics driver 116.

The example policy definer 602 of FIG. 6 of the example authentication module 132 configures the example hypervisor 124 such that the example offload process protector 134 can monitor the execution of offloaded computing task(s) 504 (block 1412). In the example of FIG. 14, the configuration of the offload process protector 134 includes establishing the example isolated memory 136 of FIG. 1 as memory locations to be monitored by the example offload process protector 134.

With the example trusted channel 500 of FIG. 5 established and the example offload process protector 134 configured, the example graphics driver 116 routes data received via the secure tunnel 502 to the example GPU 106 for execution (block 1414). That is, the example graphics driver 116 routes data received via the example privileged interface(s) 604 to the example isolated region of memory 136 for protected execution on the example GPU 106. Further, the example graphics driver 116 routes data received via the example unprivileged interface(s) 606 to the memory regions 506 not protected by the example offload process protector 134 (block 1416). If the example authentication module 132 is to be terminated (block 1418), the example of FIG. 14 ends (block 1420). Otherwise, control proceeds to block 1402.

Figure 15:
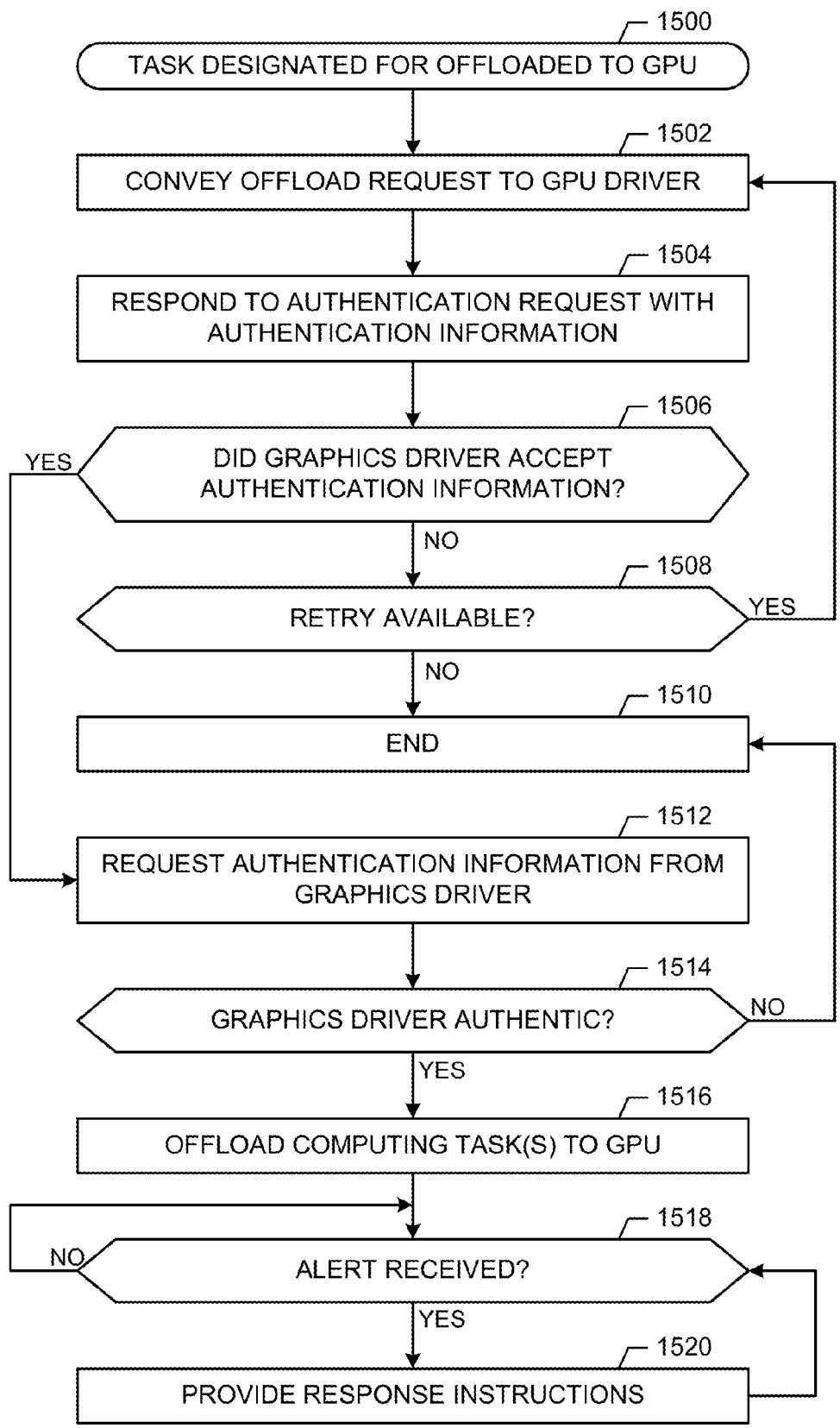
FIG. 15 is a flowchart representative of example machine readable instructions that may be executed to implement the example application driver of FIGS. 1 and/or 7.

FIG. 15 is a flowchart representative of example machine readable instructions for implementing the example application driver 122 of FIGS. 1 and/or 7. FIG. 15 begins with the example application driver 122 designating one or more computing tasks for offloading to the example GPU 106 (block 1500). The example application driver 122 conveys an indication of this designation to the example graphics driver 116 (block 1502). In the illustrated example of FIG. 15, the application driver 122 receives a request for authentication information from the authentication module 132 of the graphics driver 116 when the indication of a task being designated for offloading is sent to the graphics driver 116. The example authenticator 700 of the example application driver 122 of FIG. 7 responds to the request from the authentication module 132 of the graphics driver 116 with the requested authentication information (block 1504). In the illustrated example, the requested authentication information includes one or more keys that are recognizable by the authenticator 600 of the authentication module 132 of the graphics driver 116 as corresponding to a trusted application (e.g., not malware). If the graphics driver 116 rejects the provided authentication information (block 1506), the example authenticator 700 of the application driver 122 retries (if possible) the conveyance of the authentication information. In the example of FIG. 15, only a certain number (e.g., three) of retries are available. If a retry is available (block 1508), control returns to block 1502. If a retry is not available (e.g., the limit of retries has been reached) (block 1508), the example of FIG. 15 ends (block 1510).

If the authentication module 132 of the graphics driver 116 accepts the authentication information (block 1506), the example authenticator 700 of the application driver 122 requests authentication information from the graphics driver 116 such that the drivers 116, 122 can be mutually authenticated, as required to establish the example trusted channel 500 of FIG. 5 (block 1512). The example authenticator 700 of the application driver 122 receives the authentication information (e.g., one or more keys) from the graphics driver 116 and determines whether the received authentication information indicates that the graphics driver 116 is authentic (e.g., not malware posing as a graphics driver) (block 1514). If the authenticator 700 of the application driver 122 determines that the graphics driver 116 is authentic (block 1514), the example offloader 702 of the application driver 122 facilitates offload of the one or more designated computing tasks to GPU 106 by conveying the computing task(s) to the graphics driver 116 via the example secure tunnel 502 (block 1516). In the example of FIG. 15, the conveyance of the computing task(s) is securely facilitated via the privileged interface(s) 604 of the example graphics driver 116.

As the offloaded computing task(s) 504 are executed on the example GPU 106 of FIG. 1, the example offload process protector 134 monitors the isolated region of memory 136 in which the offloaded computing task(s) 504 are being executed. If the example callback receiver 704 of the application driver 122 receives an alert in connection with the monitoring of the isolated region of memory 136 (block 1518), the example callback receiver 704 determines an appropriate response (e.g., per a query to a lookup table including instructions regarding responding to potential unauthorized access of the isolated region of memory 136) and conveys the appropriate response to the example offload process protector 134 (block 1520).

Figure 16:
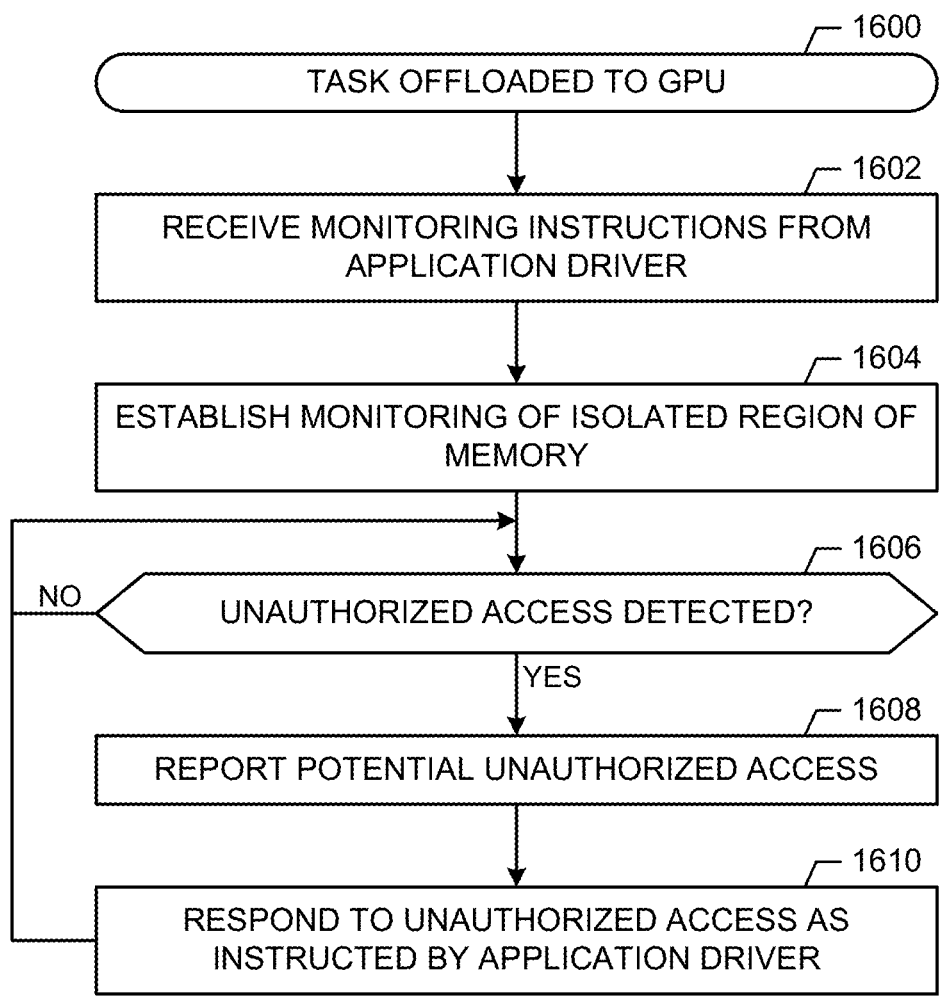
FIG. 16 is a flowchart representative of example machine readable instructions that may be executed to implement the example offload process protector of FIGS. 1 and/or 8.

FIG. 16 is a flowchart representative of example machine readable instructions for implementing the example offload process protector 134 of FIGS. 1 and/or 8. FIG. 16 begins with one or more computing tasks being offloaded to the example GPU 106 of FIG. 1 (block 1600). While the example hypervisor 124 may run before the computing task(s) are offloaded, in the example of FIG. 16 the hypervisor 124 is configured by, for example, the policy definer 602 of the example authentication module 132 of FIG. 6. In the illustrated example, the configuration of the hypervisor 124 includes receiving instructions for the offload process protector 134 regarding the monitoring of memory associated with the example offloaded computing task(s) 504 (block 1602). The example offload process protector 134 is provided with, for example, a plurality of memory address (e.g., a sequential range of address) to monitor, thereby enabling the hypervisor 124 to be made aware of any attempt to access, for example, the isolated region of memory 136 of FIG. 1. As described above, the example offload process protector 134 enjoys the highest privilege level allowed in the example computing platform 100 and, thus, can monitor attempted access of any component (e.g., program). Using the received instructions, the example offload process protector 134 establishes the monitoring of, for example, the isolated region of memory 136 of FIG. 1 (block 1604).

In the example of FIG. 16, the memory monitor 800 of the example offload process protector 134 of FIG. 8 determines whether an unauthorized access of the example isolated region of memory 136 has occurred (block 1606). If such an attempt is detected by the example memory monitor 800 (block 1606), the example reporter 802 of the example offload process protector 134 of FIG. 8 generates an alert and conveys a message to, for example, the application driver 122 (block 1608). As described above, the example callback receiver 704 of the application driver 122 informs the example offload process protector 134 as to a protective response to the detected unauthorized attempted access. In the illustrated example, the rule enforcer 804 of the offload process protector 134 implements the appropriate protective action(s) such as, for example, denying the requested access (block 1610). The example memory monitor 800 continues to monitor the isolated region of memory 136 (block 1606).

Figure 17:
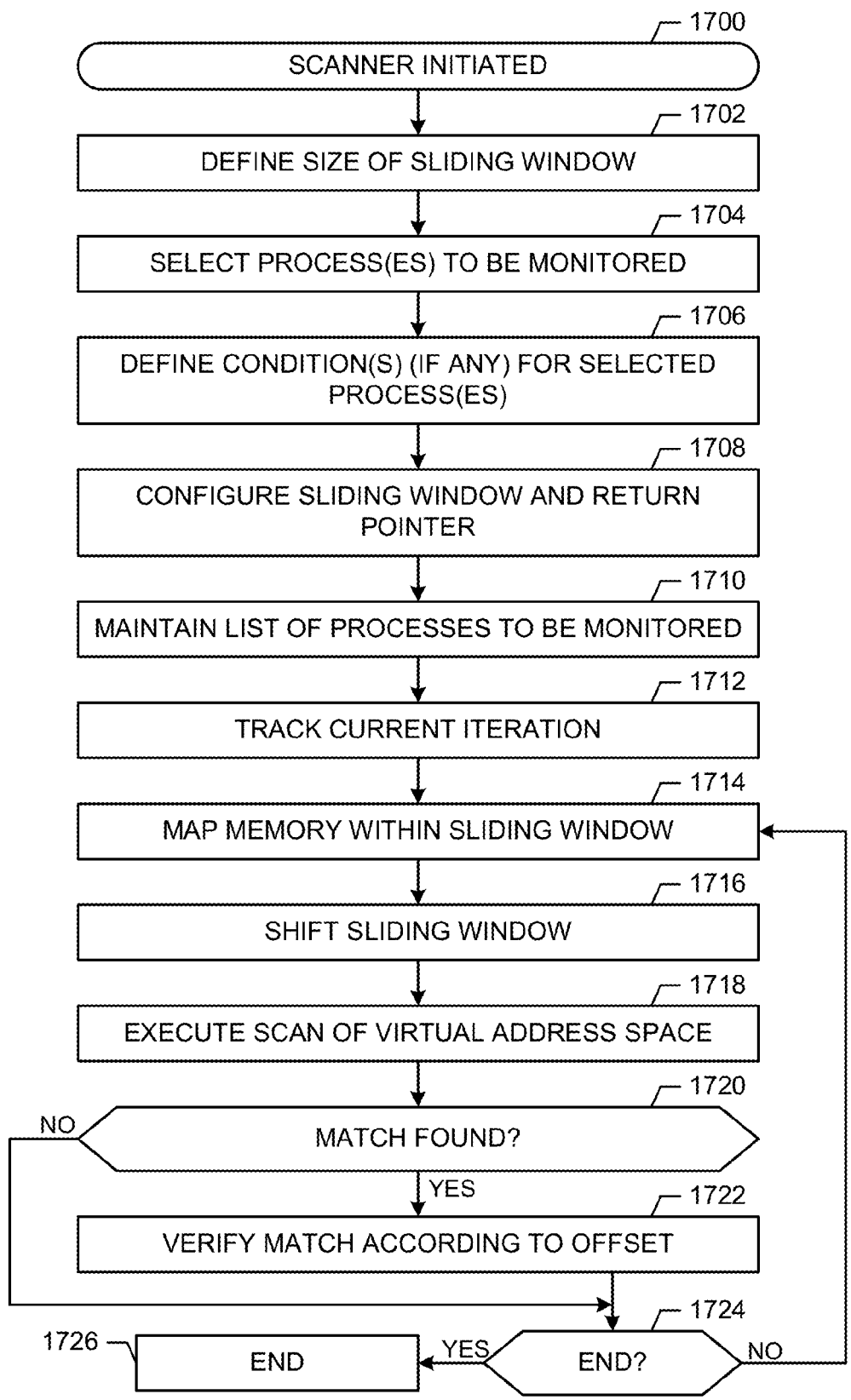
FIG. 17 is a flowchart representative of example machine readable instructions that may be executed to implement the example scanner of FIGS. 1 and/or 9.

FIG. 17 is a flowchart representative of example machine readable instructions for implementing the example scanner 138 of FIGS. 1 and/or 9. The example of FIG. 17 begins with initiation of the example scanner 138 (block 1700). The initiation of the example scanner 138 corresponds to, for example, the OS 102 becoming active and/or being loaded. In the example of FIG. 17, the window size definer 908 (e.g., via the API 916 of the kernel-mode driver 902) of the user-mode client 900 defines a size of the sliding window, which is to be used to map specific memory to the example virtual address space 906 (block 1702). As described above, the size of the sliding window determines an amount of memory to be scanned in parallel by the example scanner 138. Further, the sliding window implemented by the example scanner 138 can simultaneously encompass memory corresponding to more than one process to be monitored, thereby providing an ability to execute a plurality of scans on different respective process in parallel.

In the example of FIG. 17, the one or more process to be scanned (or otherwise processed by the GPU 106) are selected by the process selector 910 (e.g., via the API 916 of the kernel-mode driver 902) (block 1704). For example, in FIG. 10, PROCESSES A-E and the kernel process are selected to be monitored. The designation of which process(es) to monitor is conveyed by, for example, PIDs and/or names. In some examples, the designation of which process to be scanned is provided by the scan target selector 210 of FIG. 2 and/or the real-time receiver 404 of FIG. 4. Additionally, one or more conditions may be selected by the example condition selector 912 (e.g., via the API 916 of the kernel-mode driver 902) to further define which aspects or portions (e.g., a memory range corresponding to a particular operation of a selected process) of the selected process(es) are to be monitored (block 1706).

In the example of FIG. 17, the kernel-mode driver 902 configures the sliding window in accordance with the received parameters provided by the example user-mode client 900 (block 1708). Additionally, the example kernel-mode driver 902 returns a pointer to the user-mode client 900 indicative of a location in the virtual address space 906 at which the sliding window 1000 resides (block 1708). Further, the example memory region tracker 918 maintains a list of the selected processes and/or conditions to track the regions of memory to be monitored according to the received parameters from the user-mode client 900 (block 1710). Maintaining the list includes, for example, keeping the list of processes up-to-date by, for example, monitoring process creation and/or process destruction and adding and removing processes as required. Further, the example current iteration tracker 920 tracks a current position in the process and/or kernel currently being monitored as the sliding window 1000 progresses through, for example, the progression 1002 of FIG. 10 (block 1712).

With the sliding window 1000 configured and the appropriate parameters being tracked, the regions of memory within the sliding window are mapped to the virtual address space 906 by the example mapper 904 (block 1714). When the sliding window 1000 has mapped a particular amount of data and/or a the designated processes and/or regions of memory corresponding to portions of the designated processes, the sliding window is shifted to, for example, a next position according to the example progression 1002 of FIG. 10 (block 1716).

In the example of FIG. 17, the example workload executor 914 executes the scans (e.g., for the malware-indicative patterns 200 of FIG. 2) of memory mapped in the virtual address space 906 (block 1718). If a match is found, an offset into the virtual address space 906 is provided and can be used to identify the corresponding region of memory (e.g., via a tracking of the mapping procedure into the virtual address space 906 and the associated correspondences between memory locations and offsets) (block 1720). In the example of FIG. 17, the verifier 922 of the kernel-mode driver 902 verifies the match to protect against, for example, a race condition causing outdated data to be subjected to the scan (block 1722). If the example scanner 138 is to be terminated (block 1724), the example of FIG. 17 ends (block 1726). Otherwise, control returns to block 1716). Alternatively, the examples scanner 138 may receive an adjustment to, for example, a configuration of the sliding window 1000, in which case control returns to block 1702.

In the examples of FIGS. 11-17, the machine readable instructions comprise one or more programs for execution by a processor such as the processor 1812 shown in the example processor platform 1800 discussed below in connection with FIG. 18. The programs may be embodied in software stored on a tangible computer readable storage medium such as a CD-ROM, a floppy disk, a hard drive, a digital versatile disk (DVD), a Blu-ray disk, or a memory associated with the processor 1812, but the entire program and/or parts thereof could alternatively be executed by a device other than the processor 1812 and/or embodied in firmware or dedicated hardware. Further, although the example programs are described with reference to the flowcharts illustrated in FIGS. 11-17, many other methods of implementing the example scan manager 128 of FIGS. 1 and/or 2, the example notification module 130 of FIGS. 1 and/or 3, the example network interface driver 120 of FIGS. 1 and/or 4, the example authentication module 132 of FIGS. 1 and/or 6, the example application driver 122 of FIGS. 1 and/or 7, the example offload process protector 134 of FIGS. 1 and/or 8, the and/or the example scanner 138 of FIGS. 1 and/or 9, may alternatively be used. For example, the order of execution of the blocks may be changed, and/or some of the blocks described may be changed, eliminated, or combined.

As mentioned above, the example processes of FIGS. 11-17 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 11-17 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 18:
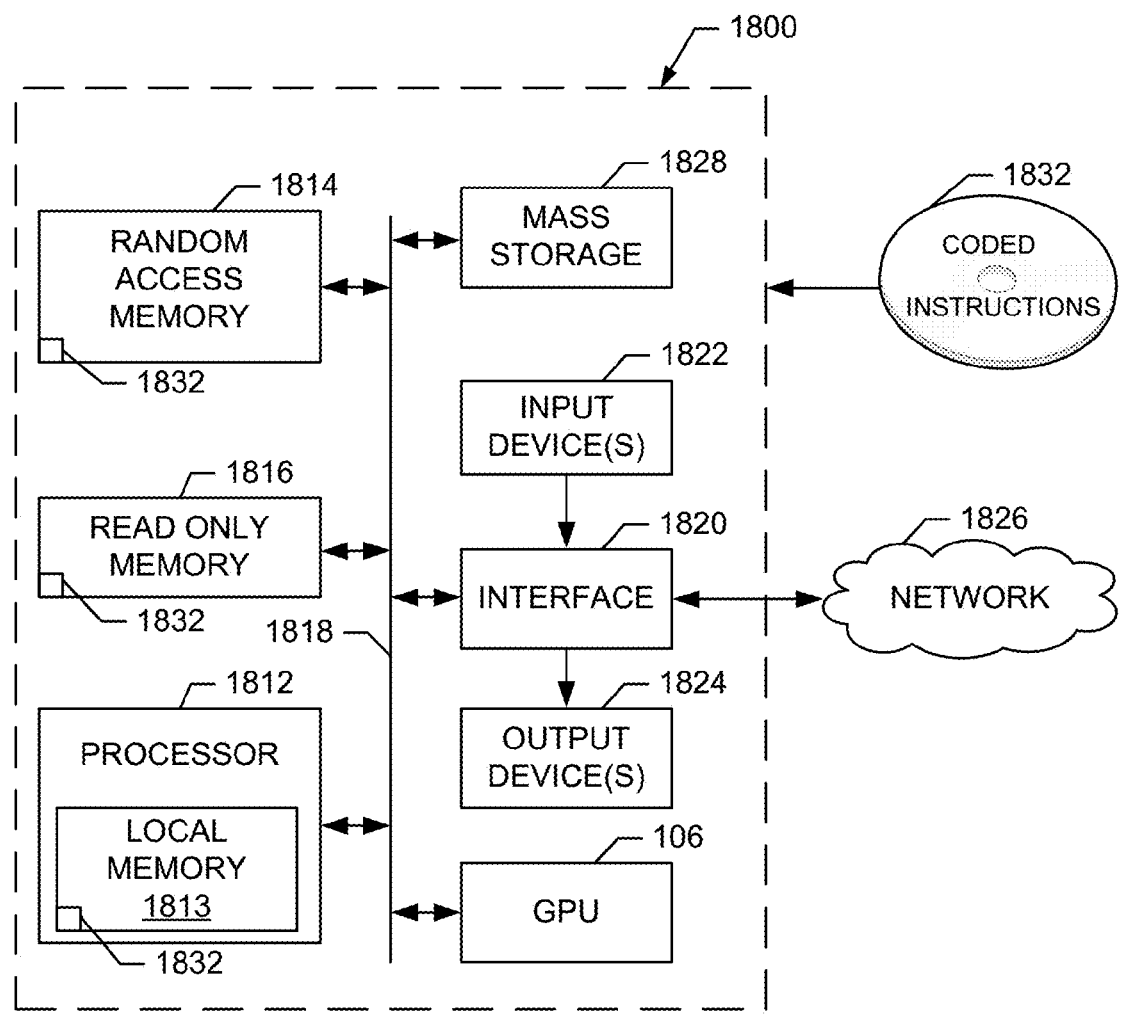
FIG. 18 is a block diagram of an example processing system implementing the example scan manager of FIGS. 1 and/or 2 by executing the example machine readable instructions of FIG. 11, the example notification module of FIGS. 1 and/or 3 by executing the example machine readable instructions of FIG. 12, the example network interface driver of FIGS. 1 and/or 4 by executing the example machine readable instructions of FIG. 13, the example authentication module of FIGS. 1 and/or 6 by executing the example machine readable instructions of FIG. 14, the example application driver of FIGS. 1 and/or 7 by executing the example machine readable instructions of FIG. 15, the example offload process protector of FIGS. 1 and/or 8 by executing the example machine readable instructions of FIG. 16, and/or the example scanner of FIGS. 1 and/or 9 by executing the example machine readable instructions of FIG. 17.

FIG. 18 is a block diagram of an example processor platform 1800 capable of executing the instructions of FIG. 11 to implement the example scan manager 128 of FIGS. 1 and/or 2, the instructions of FIG. 12 to implement the example notification module 130 of FIGS. 1 and/or 3, the instructions of FIG. 13 to implement the example network interface driver 120 of FIGS. 1 and/or 4, the instructions of FIG. 14 to implement the example authentication module 132 of FIGS. 1 and/or 6, the instructions of FIG. 15 to implement the example application driver 122 of FIGS. 1 and/or 7, the instructions of FIG. 16 to implement the example offload process protector 134 of FIGS. 1 and/or 8, and/or the instructions of FIG. 17 to implement the example scanner 138 of FIGS. 1 and/or 9. The processor platform 1800 can be, for example, a server, a personal computer, a mobile device (e.g., a cell phone, a smart phone, a tablet such as an iPad™), a personal digital assistant (PDA), an Internet appliance, a media player (e.g., a DVD player, a CD player, a digital video recorder, a Blu-ray player, etc.), a gaming console, or any other type of computing device.

The processor platform 1800 of the illustrated example includes a processor 1812 (e.g., the CPU 108 of FIG. 1). The processor 1812 of the illustrated example is hardware. For example, the processor 1812 can be implemented by one or more integrated circuits, logic circuits, microprocessors or controllers from any desired family or manufacturer.

The processor 1812 of the illustrated example includes a local memory 1813 (e.g., a cache). The processor 1812 of the illustrated example is in communication with a main memory including a volatile memory 1814 and a non-volatile memory 1816 via a bus 1818. The volatile memory 1814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1816 may be implemented by flash memory and/or any other desired type of memory device. Access to the main memory 1814, 1816 is controlled by a memory controller.

The processor platform 1800 of the illustrated example also includes an interface circuit 1820. The interface circuit 1820 may be implemented by any type of interface standard, such as an Ethernet interface, a universal serial bus (USB), and/or a PCI express interface.

In the illustrated example, one or more input devices 1822 are connected to the interface circuit 1820. The input device(s) 1822 permit(s) a user to enter data and commands into the processor 1812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1824 are also connected to the interface circuit 1820 of the illustrated example. The output devices 1824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1820 of the illustrated example, thus, typically includes a graphics driver card, a graphics driver chip or a graphics driver processor (e.g., the example GPU 106 of FIG. 1).

The interface circuit 1820 of the illustrated example also includes a communication device such as a transmitter, a receiver, a transceiver, a modem and/or network interface card (e.g., the network interface 110 of FIG. 1) to facilitate exchange of data with external machines (e.g., computing devices of any kind such as the external computing devices 400 of FIG. 4) via a network 1826 (e.g., an Ethernet connection, a digital subscriber line (DSL), a telephone line, coaxial cable, a cellular telephone system, etc.).

The processor platform 1800 of the illustrated example also includes one or more mass storage devices 1828 for storing software and/or data. Examples of such mass storage devices 1828 include floppy disk drives, hard drive disks, compact disk drives, Blu-ray disk drives, RAID systems, and digital versatile disk (DVD) drives.

Coded instructions 1832 of FIGS. 11-17 may be stored in the mass storage device 1828, in the volatile memory 1814, in the non-volatile memory 1816, and/or on a removable tangible computer readable storage medium such as a CD or DVD.

An example disclosed apparatus includes a security application to configure a security task, the security task to detect a malicious element on a computing platform, the computing platform including a central processing unit and a graphics processing unit; and an offloader to determine whether the central processing unit or the graphics processing unit is to execute the security task; and when the graphics processing unit is to execute the security task, offload the security task to the graphics processing unit for execution.

In some disclosed examples, when the offloader offloads the security task to the graphics processing unit, execution of at least one operation of the security task does not consume a cycle of the central processing unit.

In some disclosed examples, the offloader is to determine whether the central processing unit or the graphics processing unit is to execute the security task based on at least one of a first current workload of the central processing unit or a second current workload of the central processing unit.

In some disclosed examples, the offloader is to determine whether the central processing unit or the graphics processing unit is to execute the security task based on at least one of a size of the security task or a type of the security task.

In some disclosed examples, the security application is to implement the offloader.

In some disclosed examples, the apparatus further includes a scan initiator to set a frequency of execution for the security task on the graphics processing unit.

In some disclosed examples, the security task comprises a memory scan for a pattern associated with the malicious element.

An example disclosed method includes configuring a security task to detect a malicious element on a computing platform, the computing platform including a central processing unit and a graphics processing unit; determining, via the central processing unit, whether the central processing unit or the graphics processing unit is to execute the security task; and when the graphics processing unit is to execute the security task, offloading, via the processor, the security task to the graphics processing unit for execution.

In some disclosed examples, when the graphics processing unit is to execute the security task, execution of at least one operation of the security task does not consume a cycle of the central processing unit.

In some disclosed examples, determining whether the central processing unit or the graphics processing unit is to execute the security task is based on at least one of a first current workload of the central processing unit or a second current workload of the central processing unit.

In some disclosed examples, determining whether the central processing unit or the graphics processing unit is to execute the security task is based on at least one of a size of the security task or a type of the security task.

In some disclosed examples, the method further includes setting a frequency of execution for the security task on the graphics processing unit.

In some disclosed examples, the security task comprises a memory scan for a pattern associated with the malicious element.

An example disclosed tangible machine readable storage medium includes instructions that, when executed, cause a machine to at least configure a security task to detect a malicious element on a computing platform, the computing platform including a central processing unit and a graphics processing unit; determine whether the central processing unit or the graphics processing unit is to execute the security task; and when the graphics processing unit is to execute the security task, offload the security task to the graphics processing unit for execution.

In some disclosed examples, when the graphics processing unit is to execute the security task, execution of at least one operation of the security task does not consume a cycle of the central processing unit.

In some disclosed examples, the instructions, when executed, cause the machine to determine whether the central processing unit or the graphics processing unit is to execute the security task based on at least one of a first current workload of the central processing unit or a second current workload of the central processing unit.

In some disclosed examples, the instructions, when executed, cause the machine to determine whether the central processing unit or the graphics processing unit is to execute the security task based on at least one of a size of the security task or a type of the security task.

In some disclosed examples, the instructions, when executed, cause the machine to set a frequency of execution for the security task on the graphics processing unit.

In some disclosed examples, the security task comprises a memory scan for a pattern associated with the malicious element.

An example disclosed security application includes means for configuring a security task to detect a malicious element on a computing platform, the computing platform including a central processing unit and a graphics processing unit; and means for determining whether the central processing unit or the graphics processing unit is to execute the security task; and when the graphics processing unit is to execute the security task, offloading the security task to the graphics processing unit for execution.

In some disclosed examples, when the graphics processing unit is to execute the security task, execution of at least one operation of the security task does not consume a cycle of the central processing unit.

In some disclosed examples, determining whether the central processing unit or the graphics processing unit is to execute the security task is based on at least one of a first current workload of the central processing unit or a second current workload of the central processing unit.

In some disclosed examples, determining whether the central processing unit or the graphics processing unit is to execute the security task is based on at least one of a size of the security task or a type of the security task.

In some disclosed examples, the security application further includes means for setting a frequency of execution for the security task on the graphics processing unit.

In some disclosed examples, the security task comprises a memory scan for a pattern associated with the malicious element.

An example disclosed apparatus includes a dispatcher to receive a task to be executed on a graphics processing unit from a consumer of the graphics processing unit; and a notifier to provide status information associated with the task to the consumer of the graphics processing unit, wherein the status information comprises an indication of whether the task is preempted.

In some disclosed examples, the notifier is to provide the status information to the consumer of the graphics processing unit at a privilege level associated with trusted components.

In some disclosed examples, the apparatus further includes a scheduler to obtain the status information and to obtain a change in the status information.

In some disclosed examples, the status information provided by the notifier includes an identifier of the process that preempted the task.

In some disclosed examples, the apparatus further includes a security application to receive the status information and to use the status information to evaluate the process that preempted the task.

In some disclosed examples, the consumer is a security application and the task is a malware detection scan associated with the security application.

In some disclosed examples, the notifier is to receive, from the consumer of the graphics processing unit, a request for a notification of a particular aspect of the status information.

In some disclosed examples, the particular aspect of the status information comprises at least one of an initiation of the task on the graphics processing unit.

An example disclosed method includes receiving, via a processor, a task to be executed on a graphics processing unit from a consumer of the graphics processing unit; and conveying, via the processor, status information associated with the task to the consumer of the graphics processing unit, wherein the status information comprises an indication of whether the task is preempted.

In some disclosed examples, conveying the status information to the consumer of the graphics processing unit comprises conveying the status information at a privilege level associated with trusted components.

In some disclosed examples, the method further includes obtaining the status information and obtaining a change in the status information.

In some disclosed examples, the status information comprises an identifier of the process that preempted the task.

In some disclosed examples, the method further includes using the status information to evaluate the process that preempted the task.

In some disclosed examples, the consumer is a security application and the task is a malware detection scan associated with the security application.

In some disclosed examples, the method further includes receiving, from the consumer of the graphics processing unit, a request for a notification of a particular aspect of the status information.

In some disclosed examples, the particular aspect of the status information comprises at least one of an initiation of the task on the graphics processing unit.

An example tangible machine readable storage medium includes instructions that, when executed, cause a machine to at least obtain a task to be executed on a graphics processing unit from a consumer of the graphics processing unit; and convey status information associated with the task to the consumer of the graphics processing unit, wherein the status information comprises an indication of whether the task is preempted.

In some disclosed examples, the instructions, when executed, cause the machine to convey the status information to the consumer of the graphics processing unit by conveying the status information at a privilege level associated with trusted components.

In some disclosed examples, the instructions, when executed, cause the machine to obtain the status information and obtain a change in the status information.

In some disclosed examples, the status information comprises an identifier of the process that preempted the task.

In some disclosed examples, the instructions, when executed, cause the machine to use the status information to evaluate the process that preempted the task.

In some disclosed examples, the consumer is a security application and the task is a malware detection scan associated with the security application.

In some disclosed examples, the instructions, when executed, cause the machine to obtain, from the consumer of the graphics processing unit, a request for a notification of a particular aspect of the status information.

In some disclosed examples, the particular aspect of the status information comprises at least one of an initiation of the task on the graphics processing unit.

An example disclosed graphics driver includes means for receiving a task to be executed on a graphics processing unit from a consumer of the graphics processing unit; and means for providing status information associated with the task to the consumer of the graphics processing unit, wherein the status information comprises an indication of whether the task is preempted.

In some disclosed examples, the means for providing the status information is to provide the status information to the consumer of the graphics processing unit at a privilege level associated with trusted components.

In some disclosed examples, the graphics driver further includes means for obtaining the status information and a change in the status information.

In some disclosed examples, the status information provided comprises an identifier of the process that preempted the task.

In some disclosed examples, the graphics driver further includes means for using the status information to evaluate the process that preempted the task.

In some disclosed examples, the consumer is a security application and the task is a malware detection scan associated with the security application.

In some disclosed examples, the means for providing the status information is to receive, from the consumer of the graphics processing unit, a request for a notification of a particular aspect of the status information.

In some disclosed examples, the particular aspect of the status information comprises at least one of an initiation of the task on the graphics processing unit.

An example disclosed apparatus includes a reporter in communication with a security application, the security application to scan a computing platform for a first malicious element, the reporter to receive a first indication of the first malicious element from the security application when the security application detects the first malicious element on the computing platform; and convey first data associated with the first indication of the first malicious element to an external computing platform; and a receiver in communication with the security application, the receiver to receive, from the external computing platform, a second indication of a second malicious element detected on the external computing platform; and convey second data associated with the second indication of the second malicious element to the security application.

In some disclosed examples, the reporter is to convey the first data associated with the first indication of the first malicious element to the external computing platform without delay.

In some disclosed examples, conveying the first data associated with the first indication of the first malicious element to the external computing platform without delay comprises conveying the first data immediately after receiving the first indication of the first malicious element from the security application.

In some disclosed examples, the receiver is to convey the second data associated with the second indication of the second malicious element to the security application without delay.

In some disclosed examples, conveying the second data associated with the second indication of the second malicious element to the security application without delay comprises conveying the second data immediately after receiving the second indication of the second malicious element from the external computing platform.

In some disclosed examples, the reporter is to convey the first data to the external computing platform via a network, and the receiver is to receive the second indication from the external computing platform via the network.

In some disclosed examples, the reporter and the receiver are implemented by a network interface driver of the computing platform.

An example disclosed method includes receiving a first indication of a first malicious element from a security application implementing on a computing platform when the security application detects the first malicious element on the computing platform; conveying, via a processor, first data associated with the first indication of the first malicious element to an external computing platform; receiving, from the external computing platform, a second indication of a second malicious element detected on the external computing platform; and conveying, via the processor, second data associated with the second indication of the second malicious element to the security application.

In some disclosed examples, conveying the first data associated with the first indication of the first malicious element to the external computing platform comprises conveying the first data without delay.

In some disclosed examples, conveying the first data associated with the first indication of the first malicious element to the external computing platform without delay comprises conveying the first data immediately after receiving the first indication of the first malicious element from the security application.

In some disclosed examples, conveying the second data associated with the second indication of the second malicious element to the security application comprises conveying the second data without delay.

In some disclosed examples, conveying the second data associated with the second indication of the second malicious element to the security application without delay comprises conveying the second data immediately after receiving the second indication of the second malicious element from the external computing platform.

In some disclosed examples, conveying the first data to the external computing platform comprises conveying the first data via a network, and receiving the second indication from the external computing platform comprises receiving the second indication via the network.

An example disclosed tangible machine readable storage medium comprising instructions that, when executed, cause a machine to at least receive a first indication of a first malicious element from a security application implementing on a computing platform when the security application detects the first malicious element on the computing platform; convey first data associated with the first indication of the first malicious element to an external computing platform; receive, from the external computing platform, a second indication of a second malicious element detected on the external computing platform; and convey second data associated with the second indication of the second malicious element to the security application.

In some disclosed examples, the instructions, when executed, cause the machine to convey the first data to the external computing platform without delay.

In some disclosed examples, the instructions, when executed, cause the machine to convey the first data to the external computing platform without delay by conveying the first data immediately after receiving the first indication of the first malicious element from the security application.

In some disclosed examples, the instructions, when executed, cause the machine to convey the second data to the security application without delay.

In some disclosed examples, the instructions, when executed, cause the machine to convey the second data to the security application without delay by conveying the second data immediately after receiving the second indication of the second malicious element from the external computing platform.

In some disclosed examples, the instructions, when executed, cause the machine to convey the first data to the external computing platform via a network, and to receive the second indication from the external computing platform via the network.

An example disclosed network interface driver includes means for receiving a first indication of a first malicious element from a security application implementing on a computing platform when the security application detects the first malicious element on the computing platform; means for conveying first data associated with the first indication of the first malicious element to an external computing platform; means for receiving, from the external computing platform, a second indication of a second malicious element detected on the external computing platform; and means for conveying second data associated with the second indication of the second malicious element to the security application.

In some disclosed examples, the means for conveying the first data to the external computing platform is to convey the first data without delay.

In some disclosed examples, the means for conveying the first data to the external computing platform is to convey the first data without delay by conveying the first data immediately after receiving the first indication of the first malicious element from the security application.

In some disclosed examples, the means for conveying the second data to the security application is to convey the second data without delay.

In some disclosed examples, the means for conveying the second data to the security application is to convey the second data without delay by conveying the second data immediately after receiving the second indication of the second malicious element from the external computing platform.

In some disclosed examples, the means for conveying the first data to the external computing platform is to convey the first data via a network, and the means for receiving the second indication from the external computing platform is to receive the second indication via the network.

An example disclosed method includes establishing a trusted channel between a graphics driver and an application driver via mutual authentication of the graphics driver and the application; offloading, via the trusted channel, a computing task associated with the application driver to a graphics processing unit; and configuring a monitor to monitor memory associated with the offloaded computing task for an unauthorized access attempt.

In some disclosed examples, configuring the monitor comprises defining a policy for a hypervisor having a highest privilege level of a computing platform to monitor the memory.

In some disclosed examples, the method further comprises configuring the monitor to operate outside an operating system.

In some disclosed examples, the monitor is implemented via a Trusted Memory Services Layer.

In some disclosed examples, the method further comprises isolating the memory associated with the offloaded computing task from second memory associated with an image rendering task executed by the graphics processing unit.

In some disclosed examples, the application driver corresponds to a security application, and the computing task comprises a memory scanning operation to detect a pattern associated with malware.

In some disclosed examples, establishing the trusted channel is performed in response to an indication from the application driver that the computing task is to be offloaded to the graphics processing unit.

In some disclosed examples, the method further comprises denying the offload of the computing task when the mutual authentication fails.

An example disclosed apparatus includes a graphics processing unit; and a graphics driver to facilitate access to the graphics processing unit, the graphics driver comprising an authenticator to establish a trusted channel between the graphics driver and an application driver via mutual authentication of the graphics driver and the application; a first interface through which, via the trusted channel, a computing task associated with the application driver is offloaded to the graphics processing unit; and a definer to configure a monitor to monitor memory associated with the offloaded computing task for an unauthorized access attempt.

In some disclosed examples, the definer is to configure the monitor by defining a policy for a hypervisor having a highest privilege level of a computing platform to monitor the memory.

In some disclosed examples, the definer is to configure the monitor to operate outside an operating system.

In some disclosed examples, the monitor is implemented via a Trusted Memory Services Layer.

In some disclosed examples, the memory is isolated from second memory associated with an image rendering task executed by the graphics processing unit.

In some disclosed examples, the application driver corresponds to a security application, and the computing task comprises a memory scanning operation to detect a pattern associated with malware.

In some disclosed examples, the authenticator is to establish the trusted channel in response to an indication from the application driver that the computing task is to be offloaded to the graphics processing unit.

In some disclosed examples, the authenticator is to deny the offload of the computing task when the mutual authentication fails.

An example tangible computer readable storage medium includes instructions that, when executed, cause a machine to at least establish a trusted channel between a graphics driver and an application driver via mutual authentication of the graphics driver and the application; offload, via the trusted channel, a computing task associated with the application driver to a graphics processing unit; and configure a monitor to monitor memory associated with the offloaded computing task for an unauthorized access attempt.

In some disclosed examples, configuring the monitor comprises defining a policy for a hypervisor having a highest privilege level of a computing platform to monitor the memory.

In some disclosed examples, the instructions, when executed, cause the machine to configure the monitor to operate outside an operating system.

In some disclosed examples, the monitor is implemented via a Trusted Memory Services Layer.

In some disclosed examples, the instructions, when executed, cause the machine to isolate the memory associated with the offloaded computing task from second memory associated with an image rendering task executed by the graphics processing unit.

In some disclosed examples, the application driver corresponds to a security application, and the computing task comprises a memory scanning operation to detect a pattern associated with malware.

In some disclosed examples, establishing the trusted channel is performed in response to an indication from the application driver that the computing task is to be offloaded to the graphics processing unit.

In some disclosed examples, the instructions, when executed, cause the machine to deny the offload of the computing task when the mutual authentication fails.

An example disclosed apparatus includes means for establishing a trusted channel between a graphics driver and an application driver via mutual authentication of the graphics driver and the application; means for offloading, via the trusted channel, a computing task associated with the application driver to a graphics processing unit; and means for configuring a monitor to monitor memory associated with the offloaded computing task for an unauthorized access attempt.

In some disclosed examples, configuring the monitor comprises defining a policy for a hypervisor having a highest privilege level of a computing platform to monitor the memory.

In some disclosed examples, the means for configuring the monitor is to configure the monitor to operate outside an operating system.

In some disclosed examples, the monitor is implemented via a Trusted Memory Services Layer.

In some disclosed examples, the apparatus further comprises means for isolating the memory associated with the offloaded computing task from second memory associated with an image rendering task executed by the graphics processing unit.

In some disclosed examples, the application driver corresponds to a security application, and the computing task comprises a memory scanning operation to detect a pattern associated with malware.

In some disclosed examples, establishing the trusted channel is performed in response to an indication from the application driver that the computing task is to be offloaded to the graphics processing unit.

In some disclosed examples, the means for establishing the trusted channel is to deny the offload of the computing task when the mutual authentication fails.

An example method includes defining a sliding window; selecting a plurality of processes to be monitored via the sliding window; shifting the sliding window through a progression of the plurality of processes; and mapping memory within the sliding window to a virtual address space.

In some disclosed examples, the method further comprises defining a condition to determine an aspect of a first one of the plurality of processes to be mapped to the virtual address space.

In some disclosed examples, defining the sliding window comprises selecting a window size.

In some disclosed examples, the method further comprises executing a scan of the mapped memory.

In some disclosed examples, the method further comprises verifying a match found by the scan of the mapped memory.

In some disclosed examples, shifting the sliding window through the progression of the plurality of processes comprising shifting the sliding window after the memory of a current iteration is mapped to the virtual address space.

In some disclosed examples, the virtual address space corresponds to a user-mode client of a computing platform.

A disclosed example apparatus includes a window size definer to define a sliding window; a process selector to select a plurality of processes to be monitored via the sliding window; a driver to shift the sliding window through a progression of the plurality of processes; and a mapper to map memory within the sliding window to a virtual address space.

In some disclosed examples, the apparatus further comprises a condition selector to define a condition to determine an aspect of a first one of the plurality of processes to be mapped to the virtual address space.

In some disclosed examples, the window size definer is to define the sliding window by selecting a window size.

In some disclosed examples, the apparatus further comprises a workload executor to execute a scan of the mapped memory.

In some disclosed examples, the apparatus further comprises a verifier to verify a match found by the scan of the mapped memory.

In some disclosed examples, the driver is to shift the sliding window through the progression of the plurality of processes by shifting the sliding window after the memory of a current iteration is mapped to the virtual address space.

In some disclosed examples, the apparatus further comprises a user-mode client, and the virtual address space corresponds to the user-mode client.

A disclosed example tangible computer readable storage medium comprises instructions that, when executed, cause a machine to at least define a sliding window; select a plurality of processes to be monitored via the sliding window; shift the sliding window through a progression of the plurality of processes; and map memory within the sliding window to a virtual address space.

In some disclosed examples, the instructions, when executed, cause the machine to define a condition to determine an aspect of a first one of the plurality of processes to be mapped to the virtual address space.

In some disclosed examples, the instructions, when executed, cause the machine to define the sliding window by selecting a window size.

In some disclosed examples, the instructions, when executed, cause the machine to execute a scan of the mapped memory.

In some disclosed examples, the instructions, when executed, cause the machine to verify a match found by the scan of the mapped memory.

In some disclosed examples, the instructions, when executed, cause the machine to shift the sliding window through the progression of the plurality of processes by shifting the sliding window after the memory of a current iteration is mapped to the virtual address space.

In some disclosed examples, the virtual address space corresponds to a user-mode client of the machine.

A disclosed example scanner includes means for defining a sliding window; means for selecting a plurality of processes to be monitored via the sliding window; means for shifting the sliding window through a progression of the plurality of processes; and means for mapping memory within the sliding window to a virtual address space.

In some disclosed examples, the scanner further comprises means for defining a condition to determine an aspect of a first one of the plurality of processes to be mapped to the virtual address space.

In some disclosed examples, the means for defining the sliding window comprise means for selecting a window size.

In some disclosed examples, the scanner further comprises means for executing a scan of the mapped memory.

In some disclosed examples, the scanner further comprises means for verifying a match found by the scan of the mapped memory.

In some disclosed examples, shifting the sliding window through the progression of the plurality of processes comprises shifting the sliding window after the memory of a current iteration is mapped to the virtual address space.

In some disclosed examples, the virtual address space corresponds to a user-mode client of a computing platform.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
    selecting, by executing an instruction with a processor, a plurality of processes to be monitored via a sliding window;
    shifting, by executing an instruction with the processor, the sliding window through a progression of the plurality of processes;
    mapping, by executing an instruction with the processor, memory corresponding to the plurality of processes within the sliding window to a virtual address space; and
    executing a scan of the mapped memory.

2. A method as defined in claim 1, further including defining a condition to determine an aspect of a first one of the plurality of processes to be mapped to the virtual address space.

3. A method as defined in claim 1, further including selecting a window size to define the sliding window.

4. A method as defined in claim 1, wherein the executing of the scan of the mapped memory is performed by a graphics processing unit.

5. A method as defined in claim 4, further including verifying a match found by the scan of the mapped memory.

6. A method as defined in claim 1, wherein the shifting of the sliding window through the progression of the plurality of processes including shifting the sliding window after the memory of a current iteration is mapped to the virtual address space.

7. A method as defined in claim 1, wherein the virtual address space corresponds to a user-mode client of a computing platform.

8. An apparatus, comprising:
    a process selector to select a plurality of processes to be monitored via a sliding window;
    a driver to shift the sliding window through a progression of the plurality of processes;
    a mapper to map memory corresponding to a portion of the plurality of processes within the sliding window to a virtual address space; and
    a workload executor to execute a scan of the mapped memory, at least one of the process selector, the driver, or the mapper implemented via a logic circuit.

9. An apparatus as defined in claim 8, further including a condition selector to define a condition to determine an aspect of a first one of the plurality of processes to be mapped to the virtual address space.

10. An apparatus as defined in claim 8, further including a window size definer to select a window size to define the sliding window.

11. An apparatus as defined in claim 8, wherein the workload executor is implemented via a graphics processing unit.

12. An apparatus as defined in claim 11, further including a verifier to verify a match found by the scan of the mapped memory executed by the workload executor.

13. An apparatus as defined in claim 8, wherein the driver is to shift the sliding window through the progression of the plurality of processes by shifting the sliding window after the memory of a current iteration is mapped to the virtual address space.

14. An apparatus as defined in claim 8, further including a user-mode client, and wherein the virtual address space corresponds to the user-mode client.

15. A tangible computer readable storage medium comprising instructions that, when executed, cause a machine to at least:
    select a plurality of processes to be monitored via a sliding window;
    shift the sliding window through a progression of the plurality of processes;
    map memory corresponding to one of the plurality of processes within the sliding window to a virtual address space; and
    execute a scan of the mapped memory.

16. A storage medium as defined in claim 15, wherein the instructions, when executed, cause the machine to define a condition to determine an aspect of a first one of the plurality of processes to be mapped to the virtual address space.

17. A storage medium as defined in claim 15, wherein the instructions, when executed, cause the machine to select a window size to define the sliding window.

18. A storage medium as defined in claim 15, wherein the instructions, when executed, cause the machine to offload the scan of the mapped memory to a graphics processing unit.

19. A storage medium as defined in claim 18, wherein the instructions, when executed, cause the machine to verify a match found by the scan of the mapped memory.

20. A storage medium as defined in claim 15, wherein the instructions, when executed, cause the machine to shift the sliding window through the progression of the plurality of processes by shifting the sliding window after the memory of a current iteration is mapped to the virtual address space.

21. A storage medium as defined in claim 15, wherein the virtual address space corresponds to a user-mode client of the machine.

* * * * *